United States Patent
Almanza-Workman et al.

(10) Patent No.: US 9,927,650 B1
(45) Date of Patent: Mar. 27, 2018

(54) DISPLAY ASSEMBLY WITH AN OPAQUE LAYER

(71) Applicant: Amazon Technologies, Inc., Seattle, WA (US)

(72) Inventors: Angeles Marcia Almanza-Workman, Sunnyvale, CA (US); Isabella Talley Lewis, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 316 days.

(21) Appl. No.: 14/943,897

(22) Filed: Nov. 17, 2015

(51) Int. Cl.
| | | |
|---|---|---|
| *G02F 1/1335* | (2006.01) | |
| *G02F 1/167* | (2006.01) | |
| *F21V 8/00* | (2006.01) | |
| *G02F 1/1333* | (2006.01) | |

(52) U.S. Cl.
CPC ..... *G02F 1/133512* (2013.01); *G02B 6/0055* (2013.01); *G02F 1/133502* (2013.01); *G02F 1/133553* (2013.01); *G02F 1/167* (2013.01); *G02F 2001/133357* (2013.01)

(58) Field of Classification Search
CPC ......... G02F 1/133512; G02F 1/133502; G02F 1/133553; G02F 2001/133357; G02F 1/167; G02B 6/0055

USPC .......... 362/607, 606, 627, 617, 618
See application file for complete search history.

(56) References Cited

U.S. PATENT DOCUMENTS

| | | | | |
|---|---|---|---|---|
| 6,079,840 A | * | 6/2000 | Ono | G02B 6/0055 362/23.18 |
| 2010/0110334 A1 | * | 5/2010 | Oki | G02F 1/133615 349/62 |
| 2015/0277185 A1 | * | 10/2015 | Nam | G02F 1/133512 349/58 |
| 2015/0301266 A1 | * | 10/2015 | Araki | G02B 6/005 349/65 |
| 2015/0331170 A1 | * | 11/2015 | Cheng | G02B 6/0031 362/607 |
| 2016/0170130 A1 | * | 6/2016 | Jin | G02B 6/0055 349/65 |

* cited by examiner

*Primary Examiner* — Laura Tso
(74) *Attorney, Agent, or Firm* — Lowenstein Sandler LLP

(57) ABSTRACT

Displays are described. One display having a reflective display, a light guide, and a light guide cover. The light guide is disposed on a top side of the reflective display. The light guide cover is disposed on the light guide. The light guide cover includes: a cover glass disposed above the light guide; an opaque layer, disposed above the cover glass and around an edge of the reflective display that absorbs light reflected off the reflective display; and a white ink layer disposed above the opaque layer.

20 Claims, 18 Drawing Sheets

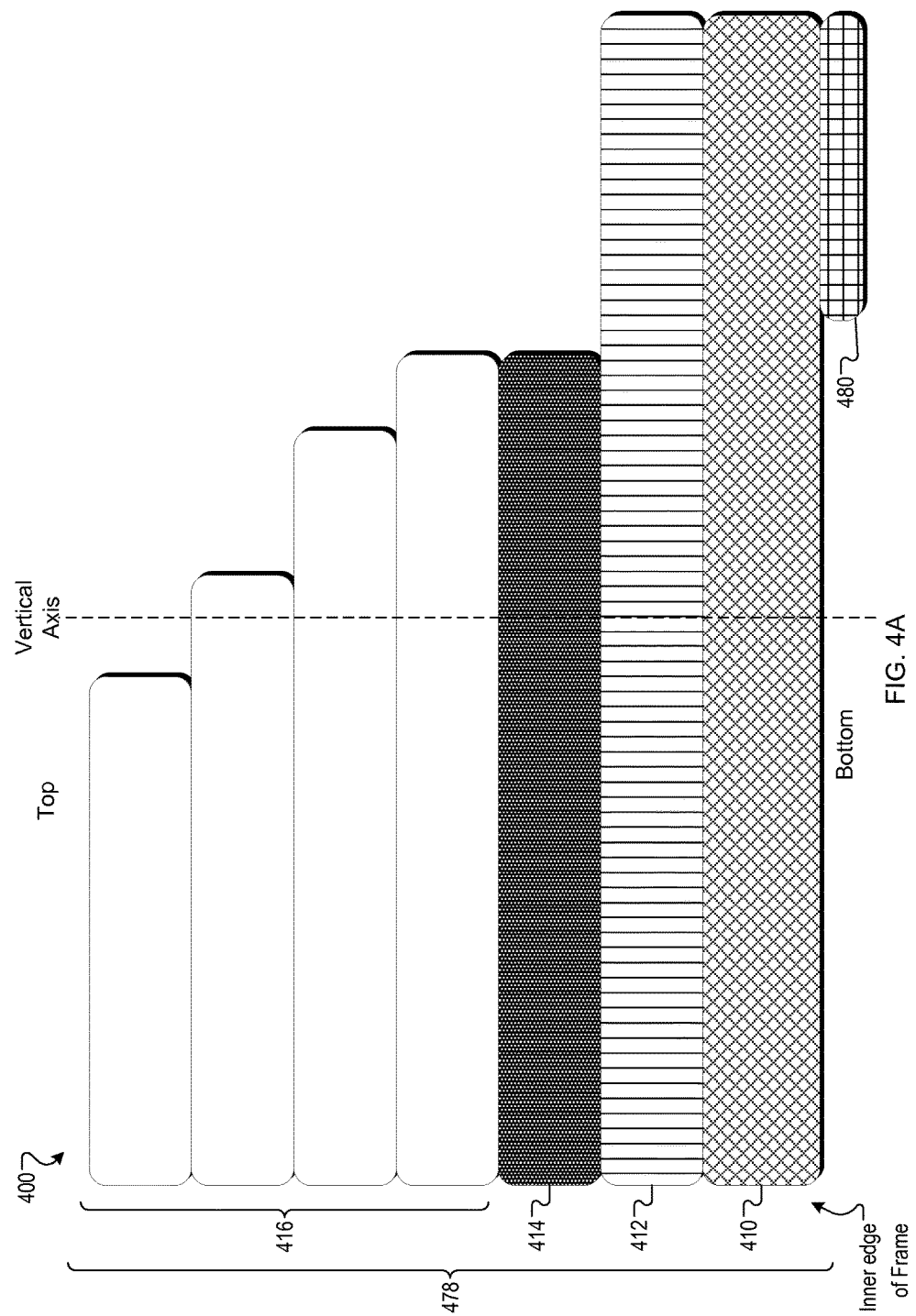

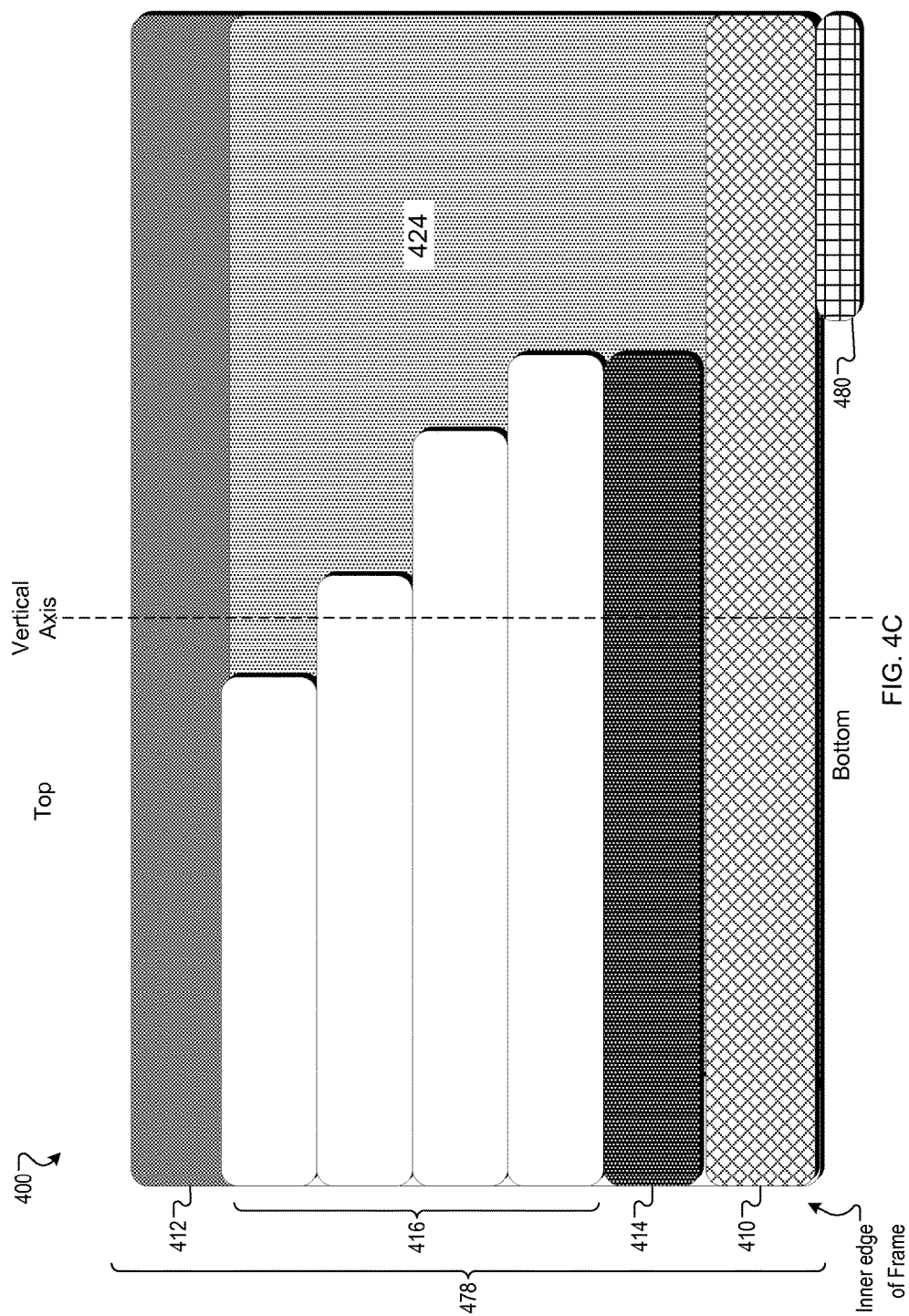

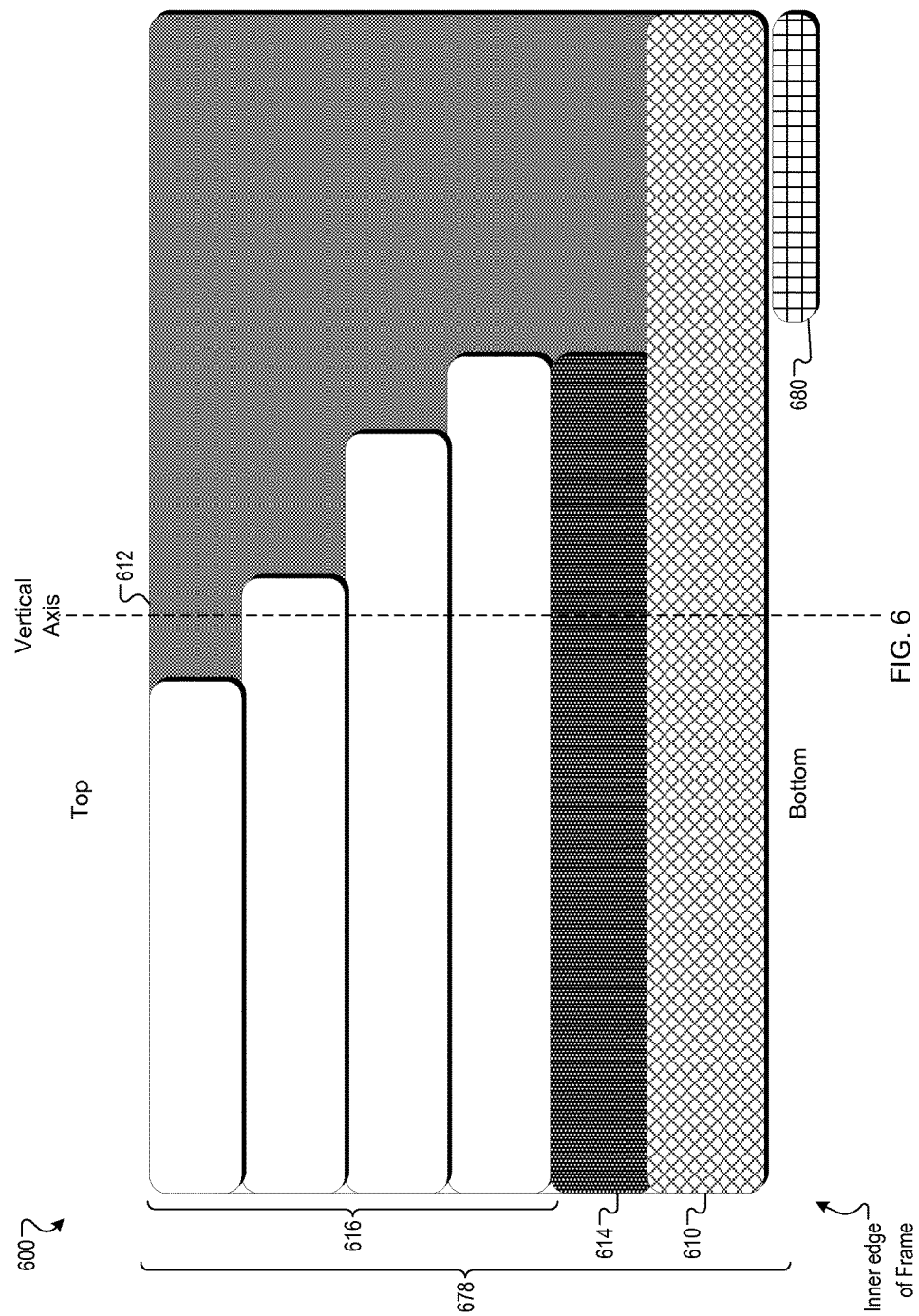

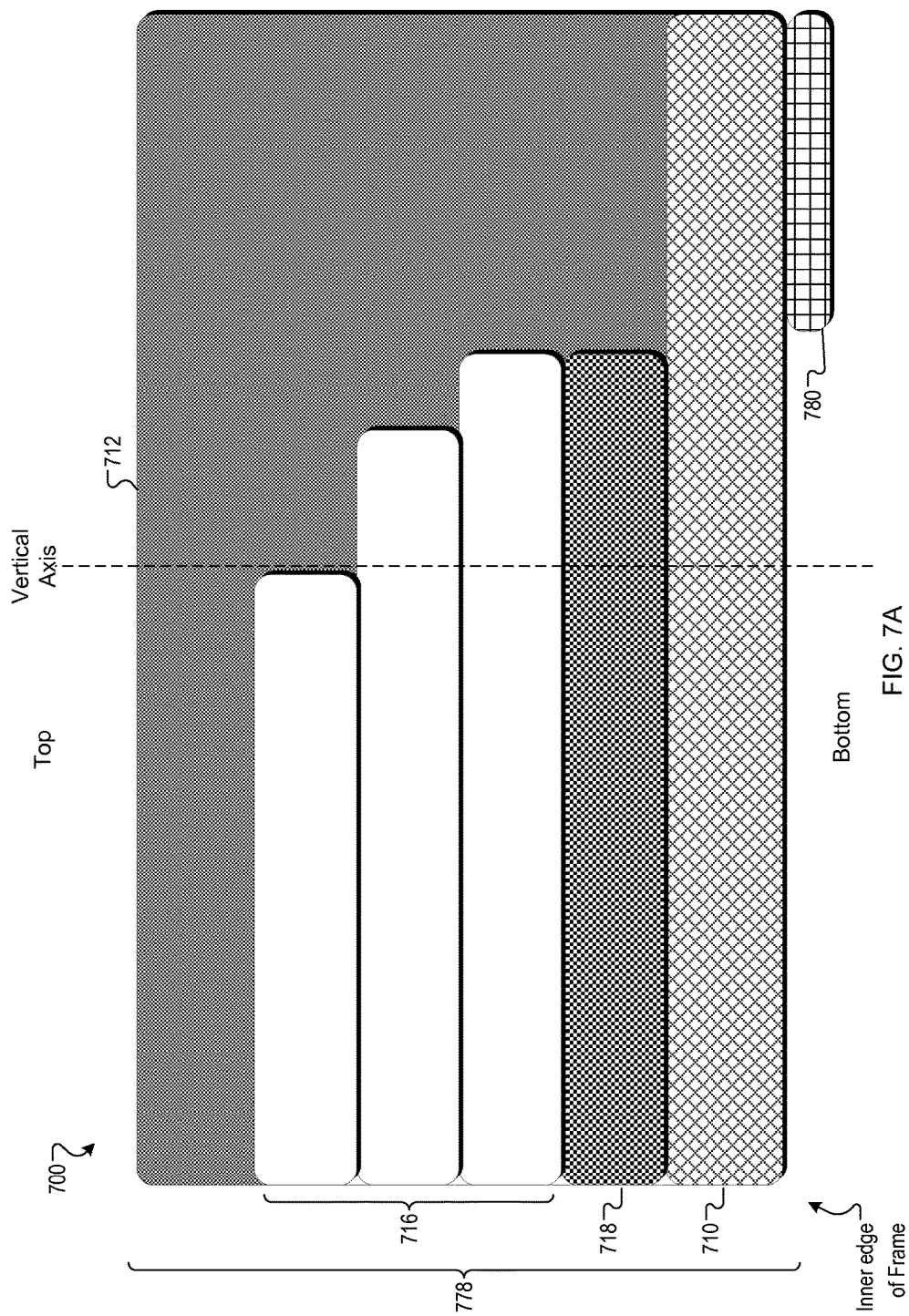

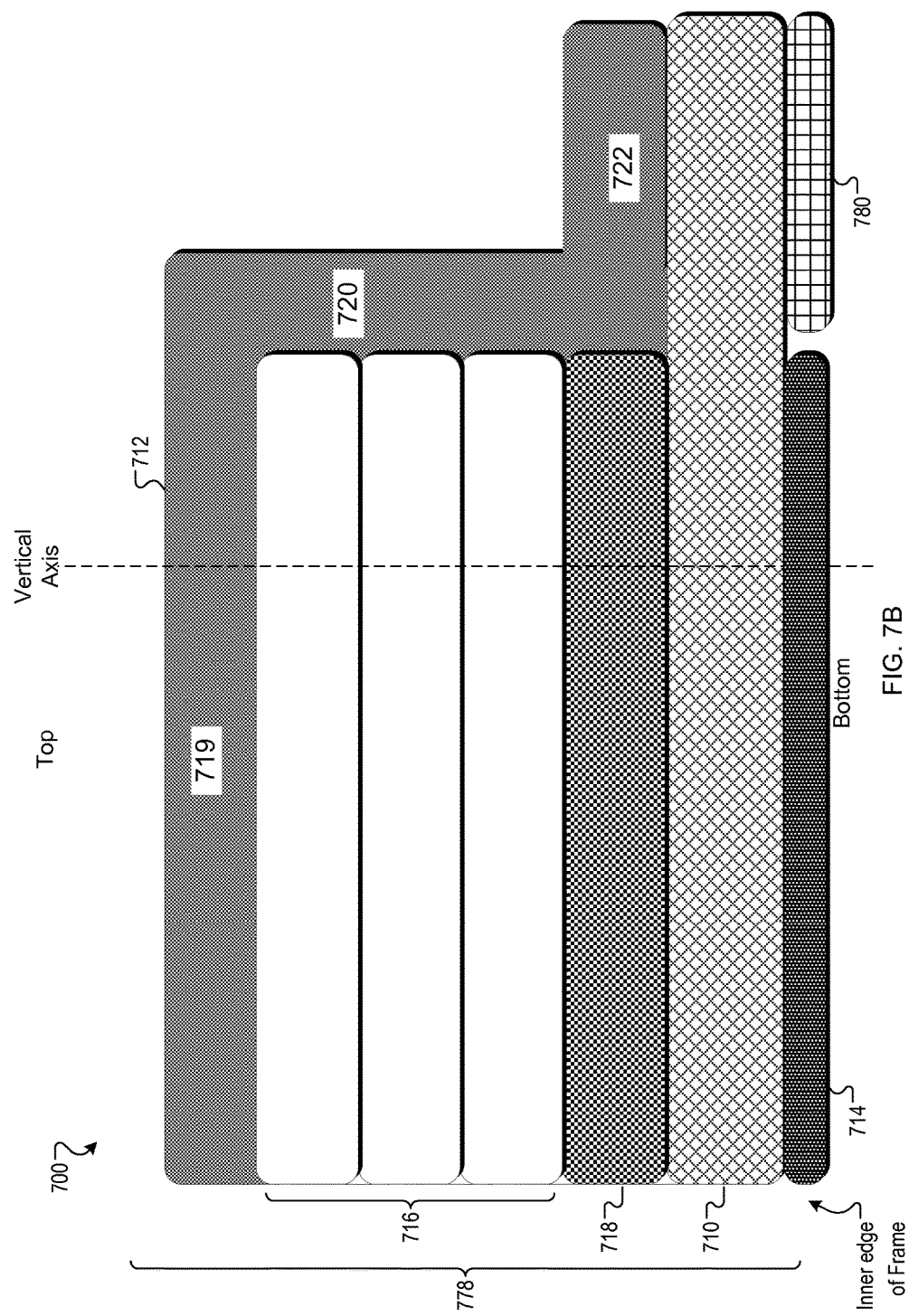

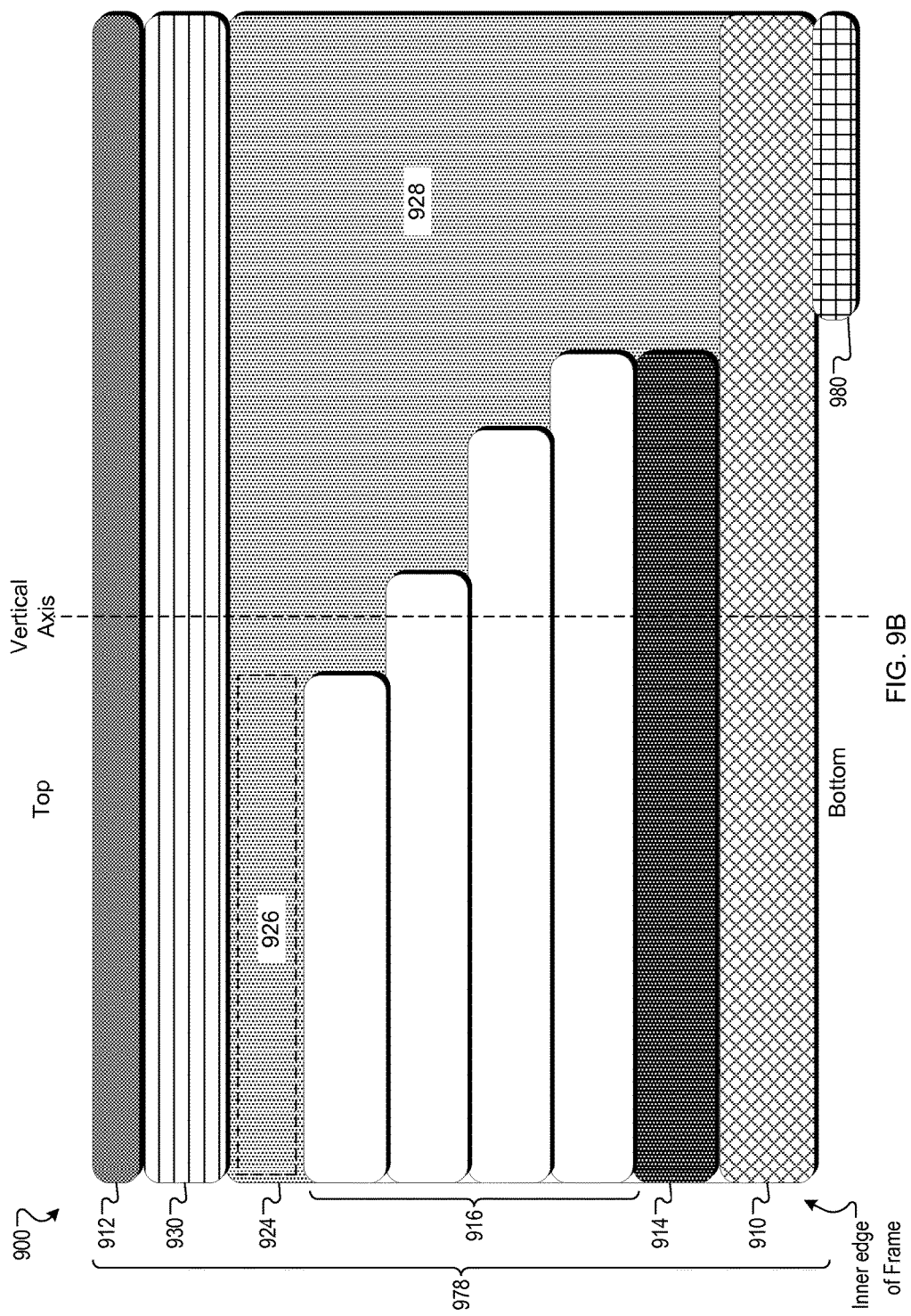

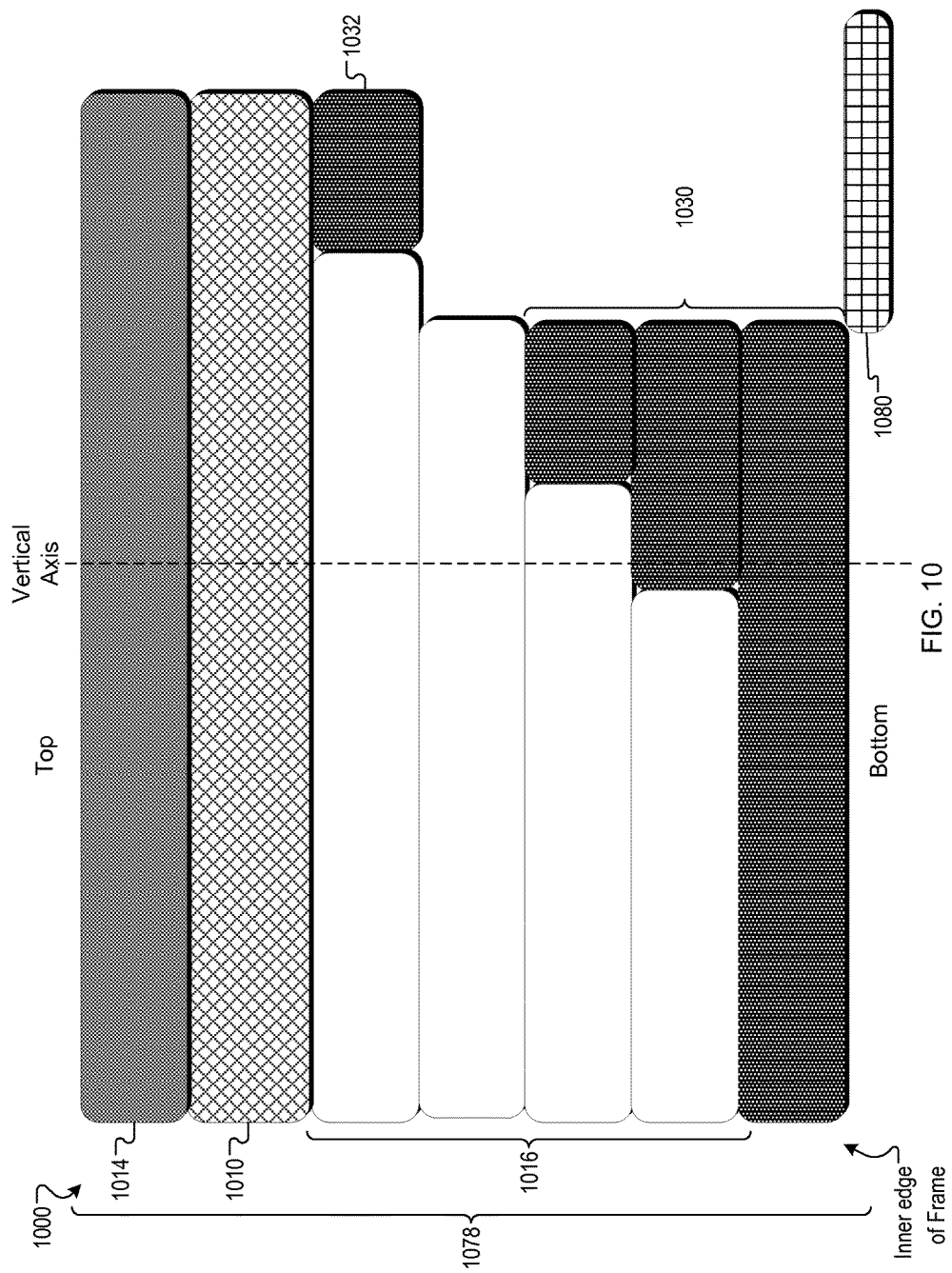

DISPLAY ASSEMBLY WITH AN OPAQUE LAYER

BACKGROUND

A large and growing population of users is enjoying entertainment through the consumption of digital media items, such as music, movies, images, electronic books, and so on. The users employ various electronic devices to consume such media items. Among these electronic devices are electronic book readers, smart phones, personal digital assistants (PDAs), portable media players, tablet computers, netbooks, laptops, and the like. These electronic devices include displays to enable the consumption of the digital media items. In order to display the digital media items, the electronic device can include displays with display lighting.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 4A illustrates a display assembly with a reflective display, a cover glass, an antiglare layer, a black ink layer, and a set of white ink layers according to one embodiment.

FIG. 4C illustrates a display assembly with a reflective display, a cover glass, an antiglare layer, a black ink layer, a set of white ink layers, and a planarization layer according to one embodiment.

FIG. 6 illustrates a display assembly with a reflective display screen, a cover glass, a black ink layer, a set of white ink layers, and an antiglare layer according to one embodiment.

FIG. 7A illustrates a display assembly with a reflective display screen, a cover glass, an aluminum layer, a set of white ink layers, and an antiglare layer according to one embodiment.

FIG. 7B illustrates a display assembly with a reflective display, a black ink layer, a cover glass, an aluminum layer, a set of white ink layers, and an antiglare layer according to one embodiment.

FIG. 9B illustrates a display assembly with a reflective display, a cover glass or film, an optically clear adhesive (OCA) layer, a black ink layer, a set of white ink layers, a film, and an antiglare layer according to one embodiment.

FIG. 10 illustrates a display assembly with a reflective display, an antiglare layer, a cover glass, a set of white ink layers, a first black ink layer, and a second black ink layer according to one embodiment.

DETAILED DESCRIPTION

Figure 1:
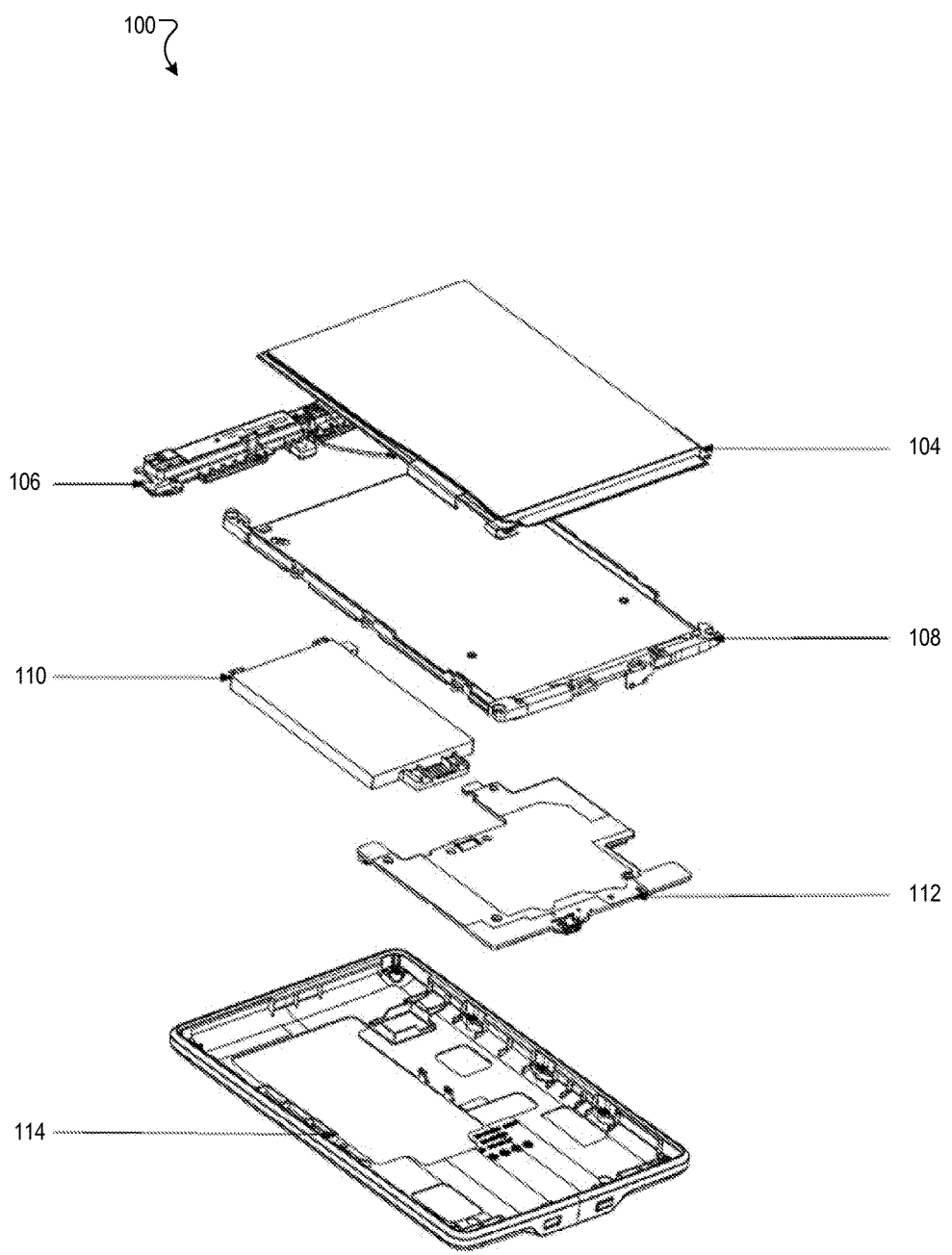
FIG. 1 illustrates an exploded view of an electronic device having a display assembly, including a light source, light guide layer, and a reflective display that is housed in a frame according to one embodiment.

Displays on many industrial, professional, and consumer devices include an illumination technology to enable users to view the display in low-light environments. Conventional light emitting diode (LED) displays can use back-lit display technology such as liquid crystal display (LCD) panels. The back-lit display technology can use an array of LEDs behind the screen.

In contrast to back-lit display technology, e.g., LCD panels, reflective displays (such as an electrophoretic display) are not back-lit. Reflective displays use light reflected off a surface of the display to illuminate the screen. By using reflective display technology, the display of electronic device can have an electronic paper display that simulates or closely mimics an appearance of paper or a printed paper document. For example, reflective displays use incident light to form an image. This incident light may be provided by the sun, general illumination in the room, a reading light, a front light, and so forth. Some example types of reflective displays include bi-stable LCDs, micro-electro-chemical systems (MEMS), electrowetting technology, cholesteric technology, interferometric technology, pigmented electrophoretic technology, and so forth. The reflective display can include color, black and white, or grayscale displays. An electronic paper display or electronic ink (E-ink) display can be a high resolution display, such as 150 dots per inch (DPI) or greater, and can display text or images even when little or no power is supplied to the display (i.e., bi-stable).

Typically, reflective displays can have various configurations for different lighting environments. For example, reflective displays configured for daytime use or normal-lighting environments rely on external light sources and do not include an integrated source for illumination. An electronic device that is configured for the daytime or normal-lighting environments can use an external light source to illuminate the reflective display. In another example, reflective displays that are configured for low-light environments or no-light environments include an integrated light source for illumination. For reflective displays that include the integrated light source, the integrated light source is disposed above the display, e.g., on a side of the reflective display that faces a user reading or viewing the reflective display. The integrated light source emits light in to a light guide above the display layer.

The integrated light source can be located at one or more edges of the reflective display, i.e., an edge-lit reflective display. The light guide of the edge-lit reflective display reflects light, from the one or more edges of the reflective display, uniformly across the surface of the reflective display. Conventionally, because the light source is brightest near the integrated light source, conventional edge-lit reflective displays have poor uniformity of light across the display surface or a dimly lit display. Additionally, light from the light guide reflects off the reflective display toward a cover glass of the display. The cover glass reflects the light and creates a glow or brighter area around the edges of the reflective display, such as where the light source is located at the edge of the display. In particular, the cover glass can have multiple layers of white ink and light from the light guide reflects off the reflective display toward the cover glass where recycled reflections create a glow on the reflective white ink. The glow on the reflective white ink is especially noticeable in low light environments, where the edges of the reflective display appear to glow brighter than the rest of the reflective display.

The embodiments described herein address the above noted deficiencies by using an opaque layer in the reflective display to absorb the light reflected back by the cover glass. For example, the opaque layer can be a black-ink layer or an aluminum layer that absorbs the light reflected back by a cover glass. In another example, the opaque layer can be a black-ink layer or an aluminum layer that blocks the light from reaching the top surface of the cover glass. In another example, the black-ink layer or the aluminum layer is adjacent a top surface of the cover glass. In one example, the aluminum layer has a low transmission that doesn't allow light going through it. The aluminum layer can reflect the light at an angle that illuminates the reflective display. In another embodiment, the aluminum layer can disperse the light and does not illuminate an edge of the cover glass. In one embodiment, an illuminated reflective display can include a light guide overlayed on top of the reflective display or above the reflective display. Other layers, such as a touch sensitive layer (e.g., a capacitive sensor layer) for detecting touch input or an adhesive layer, can reside above, below, or between the light guide and the reflective display. The embodiments that use an opaque layer can cause the reflective display to not glow around an edge of the display. The opaque layer improves a user experience with the electronic device. The embodiments described herein may produce a bright display without dim spots on the display of glowing edges that are distracting to a user.

FIG. 1 illustrates an exploded view of an electronic device 100 having a display assembly 104, including a light source, light guide layer, and a reflective display that is housed in a frame 108 according to one embodiment. The light guide layer can be optically coupled to the light source, and above the reflective display. In one embodiment, the light source can include a light emitting diode (LED) with the light guide layer propagating light from the LED through the light guide layer. In another embodiment, the light source can include an incandescent bulb with the light guide layer propagating light from the incandescent bulb through the light guide layer.

The outer housing 114 includes a cavity in to which some of the other components are placed, such as a battery 110 and a circuit board 112 or other electronic components 106. The frame 108 can be flat on the top side to accommodate the display assembly 104 and can be shaped on the bottom side to fit around and provide a space for the battery 110 and the circuit board 112. When the battery 110, the circuit board 112, the other electronic components 106, the display assembly 104, and the frame 108 are assembled in the outer housing 114.

The frame 108 can maintain contact and the relative position of the light guide layer and the light source such that light emitted from the light source propagates through the light guide layer to illuminate the reflective display. The frame 108 can include a flat region for a display layer, the light guide layer, the light source, and any other components that make up the display assembly 104. The display assembly 104 can also have a light guard cover that includes one or a combination of: a cover glass, an opaque layer, a white ink layer, and an antiglare layer. The frame 108 can include a fastening point for fastening the frame 108 to the outer housing 114.

Figure 2A:
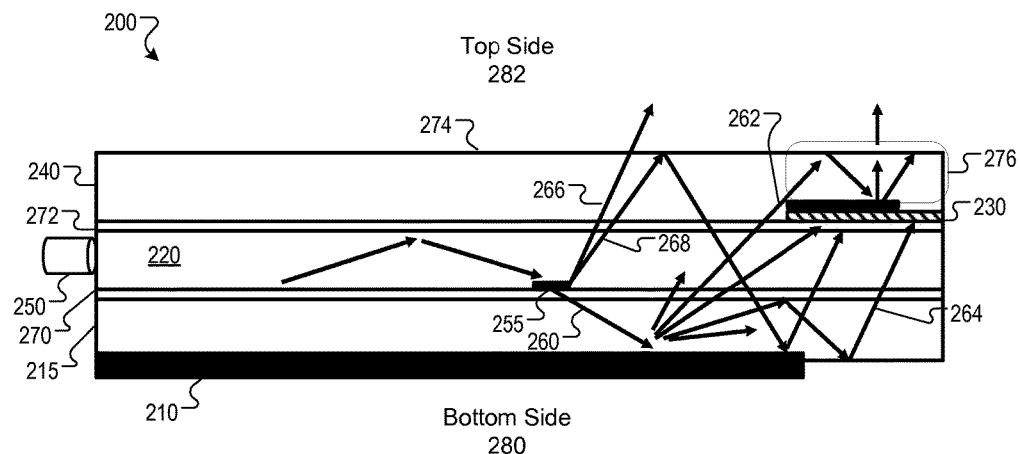
FIG. 2A illustrates a display assembly with a reflective display, a glass substrate, a light guide, a white ink, and a cover glass according to one embodiment.

FIG. 2A illustrates a display assembly 200 with a reflective display 210, a glass substrate 215, a light guide 220, a white ink 230, and a cover glass 240 according to one embodiment. The reflective display 210 can be an electronic paper display (EPD) that is an electrically-charged surface that simulates a look of ink on paper. The reflective display 210 uses movement of electrically charged molecules in an electric field (electrophoresis) to display media content, such as text, pictures, video, and so forth. In one example, the electrically charged molecules can be known as electric ink or E-ink. The E-ink uses positively charged white particles (white ink) and negatively charged black particles (black ink) suspended in a clear encapsulated fluid. In one example, the white ink is titanium oxide. In another example the black ink is carbon oxide. To form an electronic display, the encapsulated inks can be printed onto a sheet of plastic film that is laminated to a layer of circuitry. The circuitry forms a pattern of pixels that can be controlled by a display driver.

In one embodiment, when a negative electric field is applied to the circuitry, the negative electric field pushes white ink (such as titanium oxide) to a top layer of the display where the white ink is visible to the user. When the white ink is at the top layer, the surface of the display appears white at that location. In another embodiment when a positive electric field is applied to the circuitry, the positive electric field pulls the black ink to a bottom layer of the display, where the black in is not viewable. Alternatively, the negative electric field can be applied to push black ink to the top layer and the positive electric field can be applied to pull white ink to the bottom layer, where black ink appears at the location on the screen where the electric fields are applied. The reflective display 210 can be incorporated into electronic devices such as electronic newspapers (eNewspapers), smart cards, electronic shelf labels, transportation signage, electric book (eBook) reader or tablet computer screens, smartphone screens, and so forth.

The reflective display 210 can be located on a bottom side 280 of the display assembly 200. The bottom side 280 is a side of the display assembly that faces an interior of an electronic device housing, e.g., away from a user. The reflective display 210 can be coupled to a glass substrate 215 that is located on top of the reflective display 210. In one example, the glass substrate 215 is a glass that covers the reflective display to protect the display during use. In another example, the glass substrate 215 is part of a touch screen assembly. In this example, the glass substrate 215 is a glass panel coated with transparent conductive indium tin oxide (ITO) coating that is evenly distributed over both sides of a glass substrate. An electrode pattern is printed around the perimeter of the glass substrate 215 to accurately generate an alternating current over the top conductive layer. The touch of a conductive probe draws the current to the specific point of contact on the glass substrate 215.

The glass substrate 215 can be coupled to the light guide 220 that is located above the glass substrate 215. The glass substrate 215 can be coupled to the light guide 220 with a first adhesive 270. The light guide 220 can be coupled to the cover glass 240 that is located above the light guide 220. The light guide 220 can be coupled to the cover glass 240 with a second adhesive 272. The cover glass 240 can have a top surface 274 facing the top side 282. In one embodiment, a light source 250 can be coupled to the light guide 220. The light guide 220 can diffuse 255 the light from the light source 250 across a surface of the reflective display 210. A first portion of the light 260 diffused from the light guide 220 can be diffused toward a surface of the reflective display 210 to illuminate the reflective display 210. The first portion of the light 260 can be reflected off the reflective display 210 in multiple directions. A second portion of the light 262 can be reflected off the reflective display 210 towards a user and can be emitted by the cover glass 240. In one example, the second portion of the light 262 can be emitted directly off the reflective display 210 towards a user via the cover glass 240. In one example, the white ink 230 is embedded into the cover glass 240. In another example, the white ink 230 is a layer of white ink applied to the top surface of the cover glass 240. The second portion of light 262 will reflect off the top surface 274 of the cover glass 240 and back to the white ink 230 when a total internal reflection (TIR) angle of the second portion of light 262 is above a total internal reflection (TIR) angle threshold. In this example, the second portion of the light 262 will reflect off the white ink 230 towards a viewer. In one example, the TIR angle threshold is approximately a 45 degree angle in the top glass. When the second portion of light 262 is reflected off the white ink 230, the reflection can create a glow zone 276 where recycled reflections create a glowing or brighter portion on the white ink 230.

For example, the second portion of the light 262 that reflects off the reflective display 210 can further be reflected back from the cover glass 240 and can get trapped between the cover glass 240 and the white ink 230 causing a location of the display with the white ink to glow or shine brighter than other locations on the screen. The glow of the white ink is from recycled light reflecting off the white ink. In one example, a border of the display can appear to be glowing where the second portion of light 262 is incident.

A third portion of the light 264 can be reflected off the reflective display 210 towards the white ink 230 (directly or indirectly). A fourth portion of the light 266 can be emitted from the light guide 220 towards the user and can be emitted by the cover glass 240. A fifth portion of the light 268 can be reflected by the cover glass 240 back towards the reflective display 210.

Figure 2B:
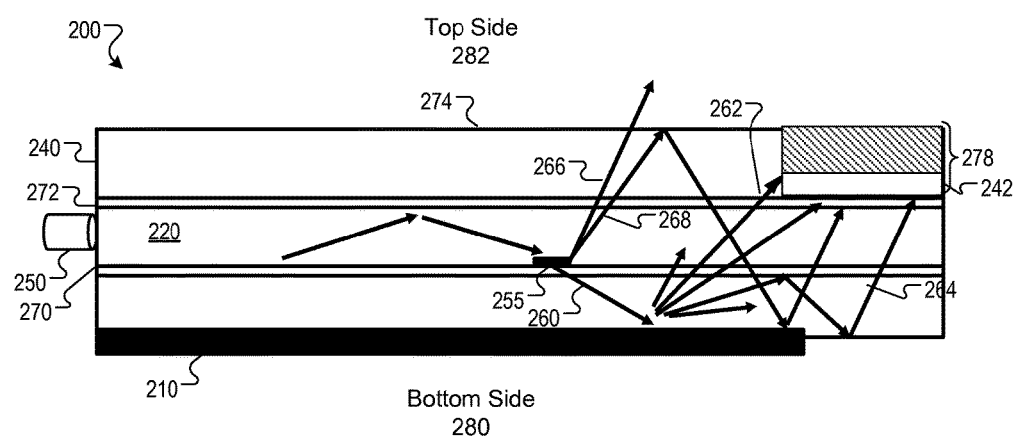
FIG. 2B illustrates a display assembly with a display, a light guide, a cover glass, and a no-glow portion according to one embodiment.

FIG. 2B illustrates a display assembly 200 with a display (reflective display) 210, a light guide 220, a cover glass 240, and a no-glow portion 278 according to one embodiment. The no-glow portion 278 is light guide cover of the display assembly 200 that can include one or a combination of a portion 242 of the cover glass, a reflective opaque layer, a white ink layer, a black ink layer, or an antiglare layer. A second portion of a light 262 can be no-glow portion 278 can absorb or reflect light the second portion of the light 262 to decrease or eliminate a glow or brighter portion for the reflective display 210. The no-glow portion 278 can include a variety of different configurations with different layers or materials as discussed in greater detail in the proceeding paragraphs. The remainder of FIG. 2B is the same as FIG. 2A, as indicated by the same reference numbers. One advantage of the no-glow portion 278 is to reduce light emitted around one or more edges of the reflective display to an acceptable level. In one example, an acceptable level can be a level of light around the edges of the reflective display that is a uniform brightness with light emitted across the remaining surface of the display 210 (e.g., the light is not brighter at the edges of the reflective display). In another example, the acceptable level can be a uniform brightness around the edges of the display assembly. In another example, the acceptable level can be a brightness level of the display that is below a threshold value. In another example, the acceptable level of the glow increases or decreases as an environment changes.

Figure 2C:
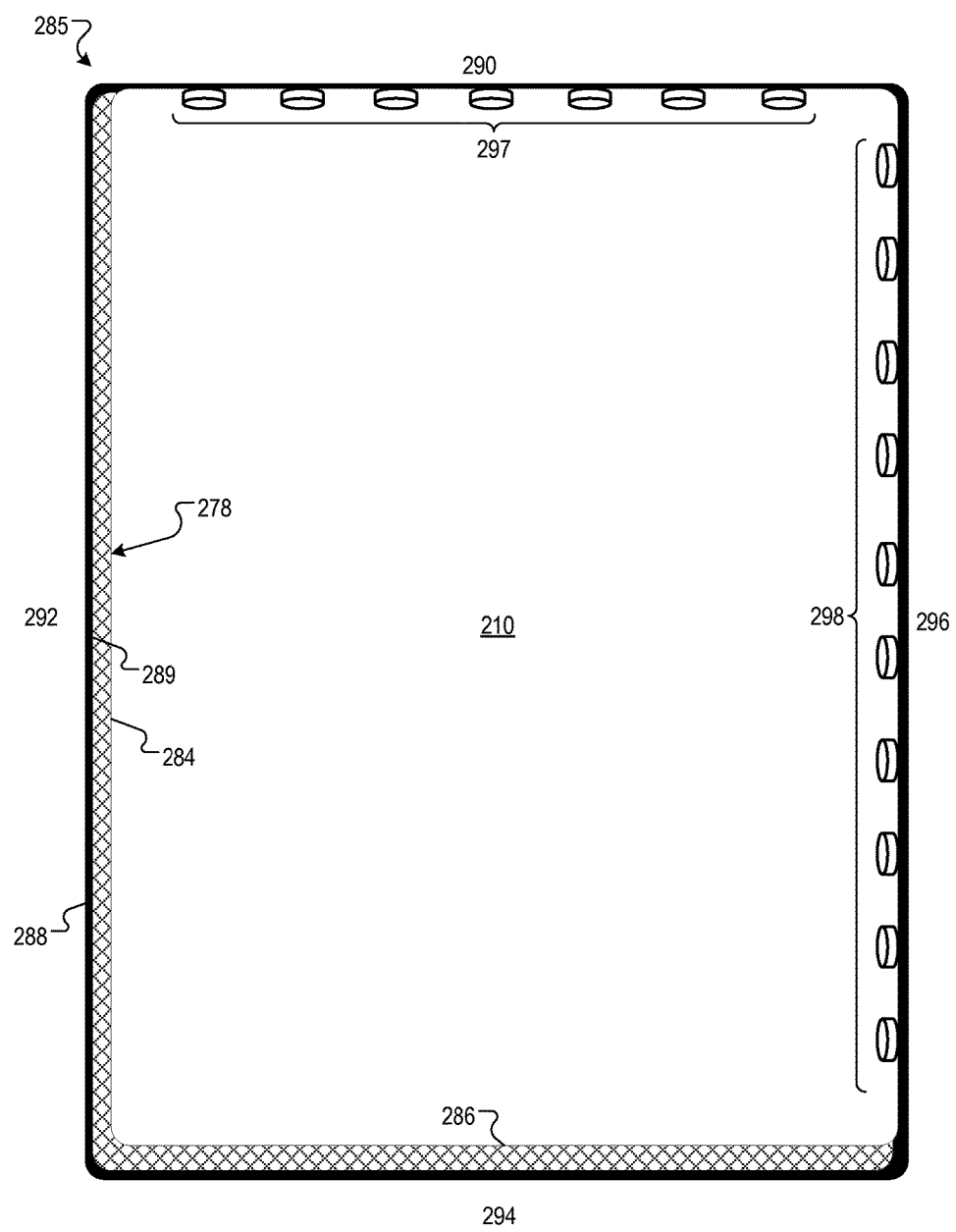
FIG. 2C illustrates an electronic device with a reflective display screen, light sources, and a no-glow portion according to one embodiment.

FIG. 2C illustrates an electronic device 285 with a reflective display screen 210, light sources 297 and 298, and a no-glow portion 278 according to one embodiment. A housing of the electronic device 285 can have a first side 290, a second side 292, a third side 294, and a fourth side 296. The reflective display screen 210 can cover an inner area of a top side 290 of the electronic device 285. In one embodiment, the reflective display screen 210 can have a thin bezel or no bezel (e.g., borderless). For example, the reflective display screen 210 can have a frame 288 around an outer edge of the reflective display screen 210 without a bezel.

In one embodiment, the no-glow portion 278 can be disposed around an outer border or edge the reflective display screen 210. The no-glow portion 278 can be coplanar to a portion of the frame 288 that encloses the reflective display screen 210. The no-glow portion 278 can be adjacent to the portion of the frame 288 that encloses the reflective display screen 210 (e.g., abutting against an inner edge 289 of the frame 288 on one or more sides of the electronic device 285). For example, a first portion 284 of the no-glow portion 278 can be disposed between an outer edge of the reflective display screen 210 and the inner edge 289 of the frame 288 on the second side 292 of the electronic device 285. In another example, the no-glow portion 278 can cover a dead zone of the reflective display screen 210 (as discussed in greater detail in the proceeding paragraphs). In another example, a second portion 286 of the no-glow portion 278 can be disposed between an outer edge of the reflective display screen 210 and the inner edge 289 of the frame 288 on the third side 294 of the electronic device 285. The no-glow portion 278 can be located along one or more side of the electronic device 285 to block reflective light from glowing along an edge of the reflective display screen 210. In one example, the light can be reflected off the reflective display screen 210 on a side opposite light sources 297 or 298, such as light emitting diodes (LEDs) or incandescent lights. In one embodiment, the first portion 284 can be on an opposite side of light source 297 to reduce or eliminate the light from the light source 297 that is reflected off the reflective display screen 210. In another embodiment, the second portion 286 can be on an opposite side of light source 298 to reduce or eliminate the light from the light source 298 that is reflected off the reflective display screen 210.

One advantage of the no-glow portion 278 can be to reduce or eliminate a glow around one or more edges of the reflective display screen 210. In another example, the no-glow portion 278 can appear to a user to be a continuous portion of the reflective display screen 210 with a white ink layer that matches a color of reflective display screen 210. Another advantage of the no-glow portion 278 matching the reflective display screen 210 can be to provide an appearance of a continuous display screen without an edge of the electronic display screen 210 glowing.

Figure 2D:
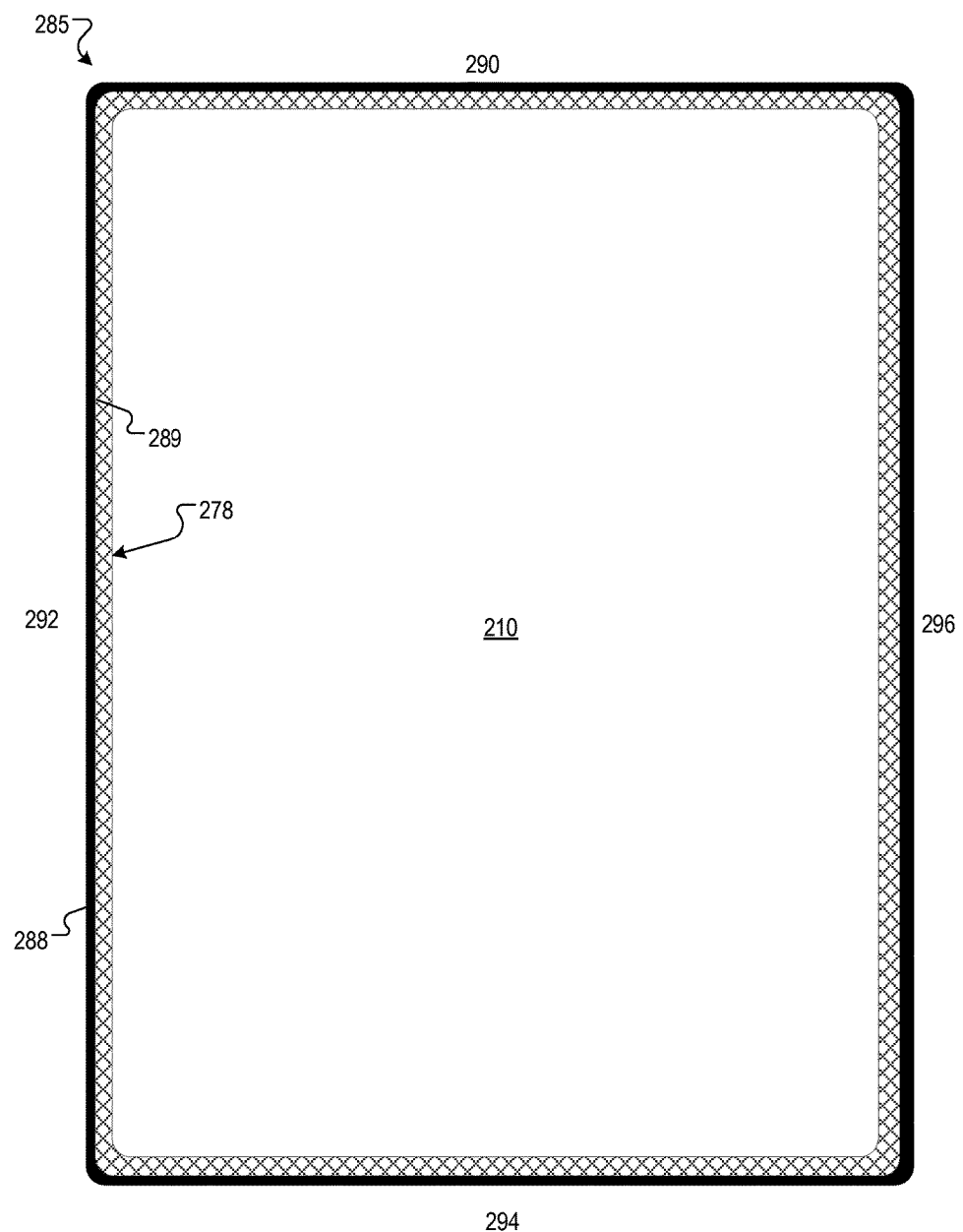
FIG. 2D illustrates an electronic device with a reflective display screen and a no-glow portion according to one embodiment

FIG. 2D illustrates an electronic device 285 with a reflective display screen 210 and a no-glow portion 278 according to one embodiment. The reference numbers in FIG. 2D can have the same numbers as in FIG. 2C to indicate the same or similar features or components as shown in FIG. 2C. However, the features or components of FIG. 2C are not intended to be limiting and other features or components can be used. In one embodiment, the no-glow portion 278 can be disposed around an outer border or edge the reflective display screen 210 and abut against an inner edge 289 of the frame 288 on the first side 290, the second side 292, the third side 294, and the fourth side 296 of the electronic device 285. The no-glow portion 278 can be located along the first side 290, the second side 292, the third side 294, and the fourth side 296 of the electronic device 285 to block reflective light from glowing along the edges of the reflective display screen 210. One advantage of the no-glow portion 278 along the first side 290, the second side 292, the third side 294, and the fourth side 296 of the electronic device 285 can be to reduce or eliminate a glow around the edges of the reflective display screen 210. Another advantage of the no-glow portion 278 along the first side 290, the second side 292, the third side 294, and the fourth side 296 of the electronic device 285 can be to provide an even lighting along the border reflective display screen 210.

Figure 3:
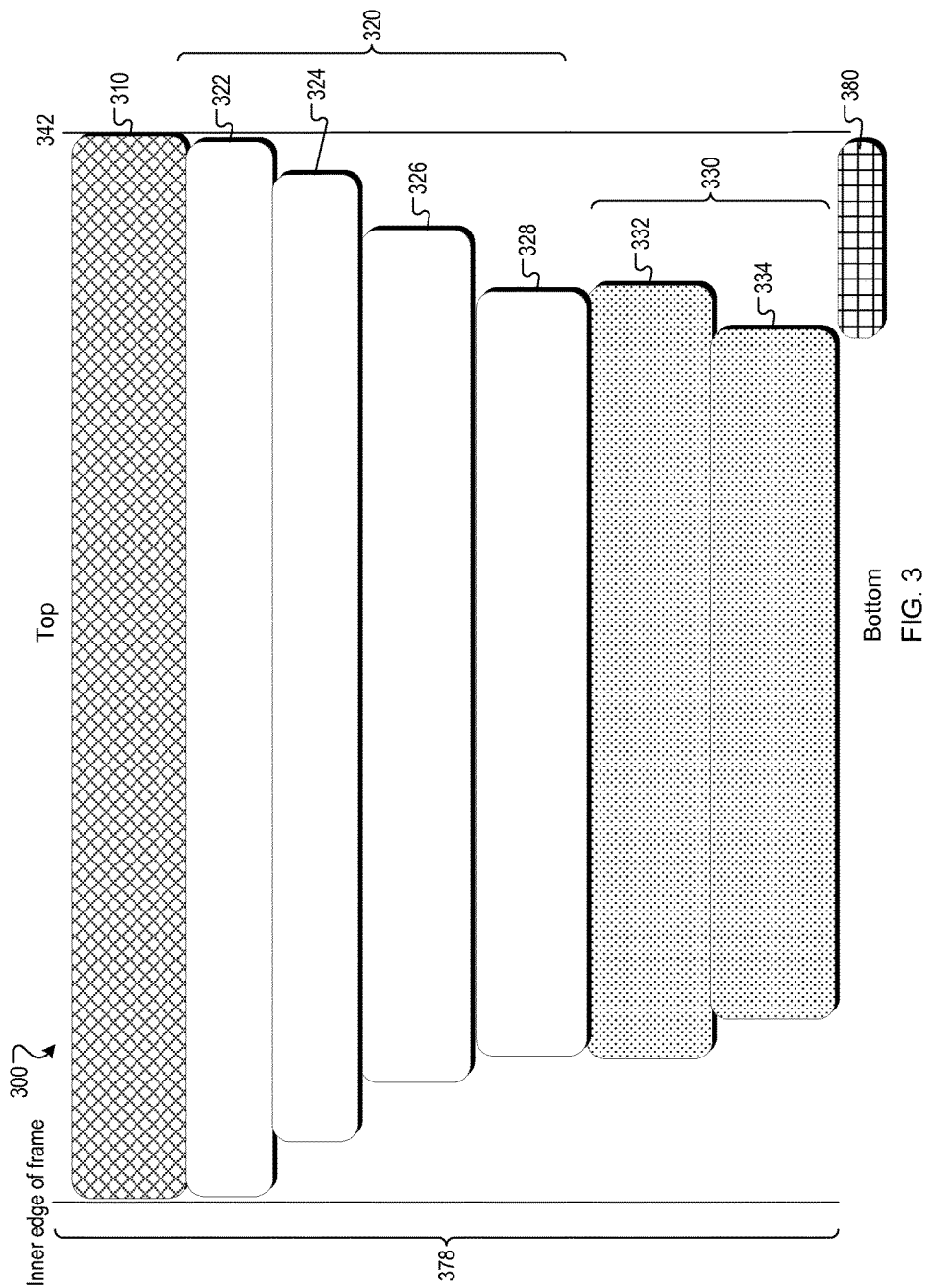
FIG. 3 illustrates a display assembly with a glass layer, a set of white ink layers, and a set of black ink layers according to one embodiment.

FIG. 3 illustrates a display assembly 300 with a glass layer 310, a set of white ink layers 320, a reflective display 380, and a set of opaque layers 330 according to one embodiment. In one example, the set of opaque layers 330 are black ink layers. The set of opaque layers 330 is located above the reflective display 380. The set of opaque layers 330 can have multiple opaque layers 330, including a first opaque layer 332 and a second opaque layer 334. The set of opaque layers 330 eliminates an illumination of the white ink from below by absorbing recycled light. In one embodiment, a thickness of the opaque layers 332-334 is the same. For example the thickness of the opaque layers 332-334 is approximately 5 μm+/−2 μm thick. In another embodiment, the thickness of the opaque layers 332-334 varies. For example, the first opaque layers 332 has a first thickness of approximately 6 μm+/−2 μm and the second opaque layer 334 has a second thickness of 7 μm+/−2 μm. The number of layers in the white ink layers 320 and the opaque layers 330 is not intended to be limiting.

The set of white ink layers 320 is layered above the set of opaque layers 330. The set of white ink layers 320 can have multiple white ink layers 320, including a first white ink layer 322, a second white ink layer 324, a third white ink layer 326, and a forth white ink layer 328. The set of white ink layers 320 can mask a color of the opaque layer 330 from a surface of the light guide cover 378 facing a viewer to maintain an appearance of a white layer across a surface of the reflective display 380. In one embodiment, the white ink layer includes multiple of white ink layers, where each of the white ink layers modifies an opacity level of the display. In another embodiment, the set of white ink layers 320 can increase a white opacity level of the display. The white opacity level of the display can refer to a whiteness level of a display surface that faces a user. For example, as a thickness of the set of white ink layers 320 increases the white opacity level increases, e.g., the display surface appears to be whiter. In another example, as a thickness of the set of white ink layers 320 decreases the white opacity level decreases, e.g., the display surface appears to be less white. The glass layer 310 is a top layer above the set of white ink layers 320 that is a cover glass that faces the reflective display 210 (FIG. 2A) and can protect the reflective display from damage, water, dust, and so forth. The reflective display 380 is the bottom layer.

In one embodiment, a thickness of the white ink layers 322-328 can be the same. For example, each white ink layer 322-328 is approximately 5 micrometers (μm)+/−2 μm thick. In another embodiment, the thicknesses of the white ink layers 322-328 can vary. In one example the first and second white ink layers 322 and 324 can have a first thickness of approximately 5 μm+/−2 μm. The third and fourth white ink layers 326 and 328 can have a second thickness of 6 μm+/−2 μm.

The number of layers in the set of white ink layers 320 and the set of opaque layers 330 can range from a single white ink layer or opaque layer to multiple white or opaque layers. In one example, the set of white ink layers 320 and the set of opaque layers 330 can be approximately 35-40 μm thick. In another example, the number of white ink layers and opaque layers can be in view of a desired color viewable at the display assembly. For example, as the number of white ink layers increases or the number of opaque layers decreases, a surface of the display assembly 300 can appear to be whiter. In another example, as the number of white ink layers decreases or the number of opaque layers increases, the surface of the display assembly 300 can appear to be blacker or darker. In another example, the opaque layer can be screen-printed onto the display assembly. The screen-printed opaque layer can have pinholes where the black ink does not entirely cover the white ink layer, e.g., light leakage. In this example, multiple opaque layers can cover or fill in the pinholes to eliminate the light leakage. For example, a single black ink layer can have pinholes that cause bright spots on a cover glass. In this example, two black ink layers can be used to absorb the reflected light and reduce or eliminate the pinholes.

In one embodiment, the opaque layer 330 is more opaque than the white ink layer 320. In another embodiment, the set of white ink layers 320 and the set of opaque layers 330 are silk screened or printed onto a surface, such as the glass layer 310.

The white ink layers 322-328 and the opaque layers 332-334 can be offset from an inner edge 289 of a frame 288 by a defined distance (FIG. 2C). In another example, the white ink layers 322-328 and the opaque layers 332-334 can be offset from a second vertical plane along a second edge 342 of the bezel. The first edge 340 can be an outer edge of a bezel or the reflective display 380. In one embodiment, the second edge 342 of the reflective display can be an inner edge of a boundary of the reflective display 380 or an edge of a dead zone. In another embodiment, the reflective display 380 can extend the length of the set of white ink layers 320 or the length of the set of opaque layers 330. When the reflective display 380 extends the length of the set of white ink layers 320 or the length of the set of opaque layers 330, the display may have the dead zone for the portion of the reflective display 380 beneath the set of white ink layers 320 or the set of opaque layers 330. The dead zone can be a portion of the reflective display 380 where no information is displayed. In one example, the first white ink layer 322 is offset 0 millimeters (mm)+/−0.05 mm from the first edge 340 and 0.1 mm+/−0.05 mm from the second edge 342. In another example, the second white ink layer 324 is offset 0.05 millimeters (mm)+/−0.05 mm from the first edge 340 and 0.2 mm+/−0.05 mm from the second edge 342. In another example, the third white ink layer 326 is offset 0.1 mm+/−0.05 mm from the first edge 340 and 0.3 mm+/−0.05 mm from the second edge 342. In another example, the fourth white ink layer 328 is offset 0.15 millimeters (mm)+/−0.05 mm from the first edge 340 and 0.4 mm+/−0.05 mm from the second edge 342. In another example, the first opaque layer 332 is offset 0.2 millimeters (mm)+/−0.05 mm from the first edge 340 and 0.3 mm+/−0.05 mm from the second edge 342. In another example, the second opaque layer 334 is offset 0.25 millimeters (mm)+/−0.05 mm from the first edge 340 and 0.4 mm+/−0.05 mm from the second edge 342. The offset of the white ink layers 320 and the opaque layers 330 is not intended to be limiting. The offset of the white ink layers 320 and the opaque layers 330 can range from no offset to for one or more of the white ink layers 320 or the opaque layers 330 to varying offsets for one or more of the white ink layers 320 or the opaque layers 330.

FIG. 4A illustrates a display assembly 400 with a reflective display 480, a cover glass 410, an antiglare layer 412, a black ink layer 414, and a set of white ink layers 416 according to one embodiment. The cover glass 410 is a bottom layer that is a cover glass that faces the reflective display 210 (FIG. 2A) and can protect the reflective display from damage, water, dust, and so forth. In one embodiment, the cover glass 410 is the bottom layer, the antiglare layer 412 is above the cover glass 410, the black ink layer 414 is above the antiglare layer 412, and the set of white ink layers 416 are above the black ink layer 414. In one embodiment, the set of white ink layers 416 mask a color of the black ink layer 414 from a surface of the light guide cover 478 facing a viewer to maintain an appearance of a white layer across a surface of the reflective display. In another embodiment, the white ink of the set of white ink layers can be thermoplastic ink, a thermoset ink, or a ceramic ink. For example, the ceramic ink can be sintered at high temperature, such as approximately 500 degrees Celsius. One advantage of the ceramic ink is that the ceramic ink has a higher abrasion resistance than standard screen printing inks and can be cured at less than 200 degrees Celsius. In another embodiment, the black ink layer 414 eliminates an illumination of the white ink from below by absorbing recycled light.

The antiglare layer 412 can be a coating to cover the cover glass 410, the black ink layer 414, and/or the set of white ink layers 416 of the display assembly 400 to reduce the glare of the cover glass 410 across the display assembly 400. In one embodiment, the antiglare layer 412 is less than 100 µm thick. In one example, that antiglare layer 412 is an antiglare solution (Sol) gel that is approximately 200-400 nm thick. In another example, the antiglare layer 412 is an ultraviolet (UV) curable coating that is approximately 5-10 µm thick. In another embodiment, the antiglare layer 412 can be etched glass with defined roughness, haze, or gloss. In another embodiment, the black ink layer 414 and the set of white ink layers 416 can have a total combined thickness of approximately 35 µm+/−5 µm.

In one embodiment, a portion of the antiglare layer 412, beneath the black ink layer 414 and the white ink layers 416, can be etched down to make a surface of the display assembly 400 flush with the remainder of the antiglare layer 412. For example the black ink layer 414 and the white ink layers 416 can be etched down by polishing the layers or using wet etching. In another embodiment, the white ink layers 416 can be reformulated to match a matte finish of the antiglare layer 412. For example, fillers can be added to the white ink to increase a roughness of the ink. In another embodiment, the white ink layers 416 can be reformulated to have a threshold abrasion resistance.

Figure 4B:
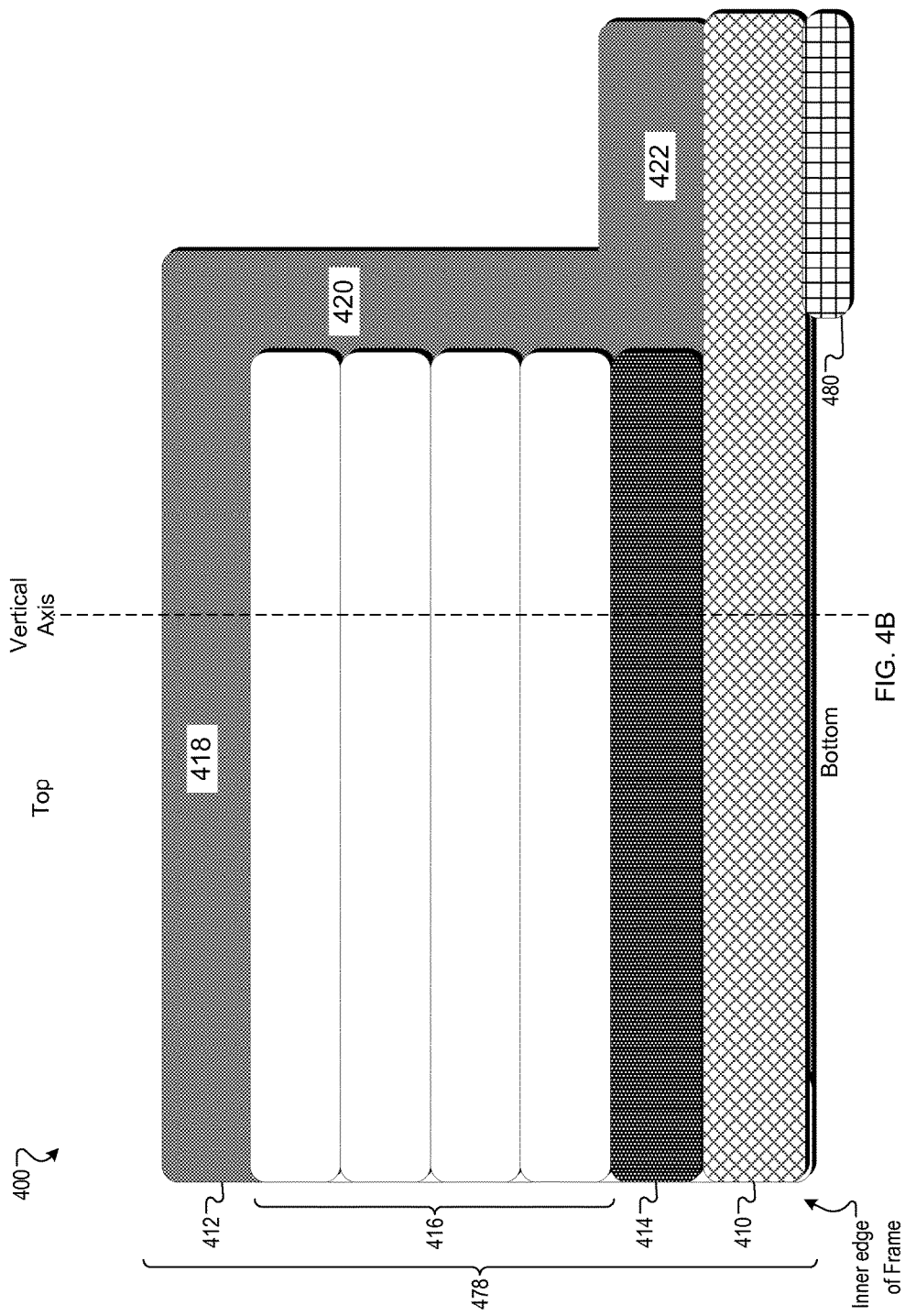
FIG. 4B illustrates a display assembly with a reflective display, a cover glass, a black ink layer, a set of white ink layers, and an antiglare layer according to one embodiment.

FIG. 4B illustrates a display assembly 400 with a reflective display 480, a cover glass 410, a black ink layer 414, a set of white ink layers 416, and an antiglare layer 412 according to one embodiment. The reference numbers in FIG. 4B can have the same numbers as in FIG. 4A to indicate the same or similar features or components as shown in FIG. 4A. However, the features or components of FIG. 4A are not intended to be limiting and other features or components can be used.

The antiglare layer 412 can be a coating to cover the cover glass 410, the black ink layer 414, and the set of white ink layers 416 of the display assembly 400 to reduce the glare of the cover glass 410 across the display assembly 400 and provide a protective layer. In one embodiment, the antiglare layer 412 can include a first antiglare portion 418, a second antiglare portion 420, and a third antiglare portion 422. The first antiglare portion 418 can be located above the set of white ink layers 416. The second antiglare portion 420 can abut against the black ink layer 414 and the set of white ink layers 416. The third antiglare portion 422 can be located above the cover glass 410.

FIG. 4C illustrates a display assembly 400 with a reflective display 480, a cover glass 410, an antiglare layer 412, a black ink layer 414, a set of white ink layers 416, and a planarization layer 424 (such as a polyimide substrate) according to one embodiment. The reference numbers in FIG. 4C can have the same numbers as in FIG. 4A to indicate the same or similar features or components as shown in FIG. 4A. However, the features or components of FIG. 4A are not intended to be limiting and other features or components can be used.

In one embodiment, the planarization layer 424 can abut against the black ink layer 414 and the set of white ink layers 416. The planarization layer 424 can cover or planarize the full ink step to eliminate a rough or uneven top surface (e.g., an ink step). The antiglare layer 412 located above the planarization layer and the set of white ink layer 416 to cover the cover glass 410, the black ink layer 414, and/or the set of white ink layers 416 of the display assembly 400 and reduce the glare of the cover glass 410 across the display assembly 400.

Figure 5:
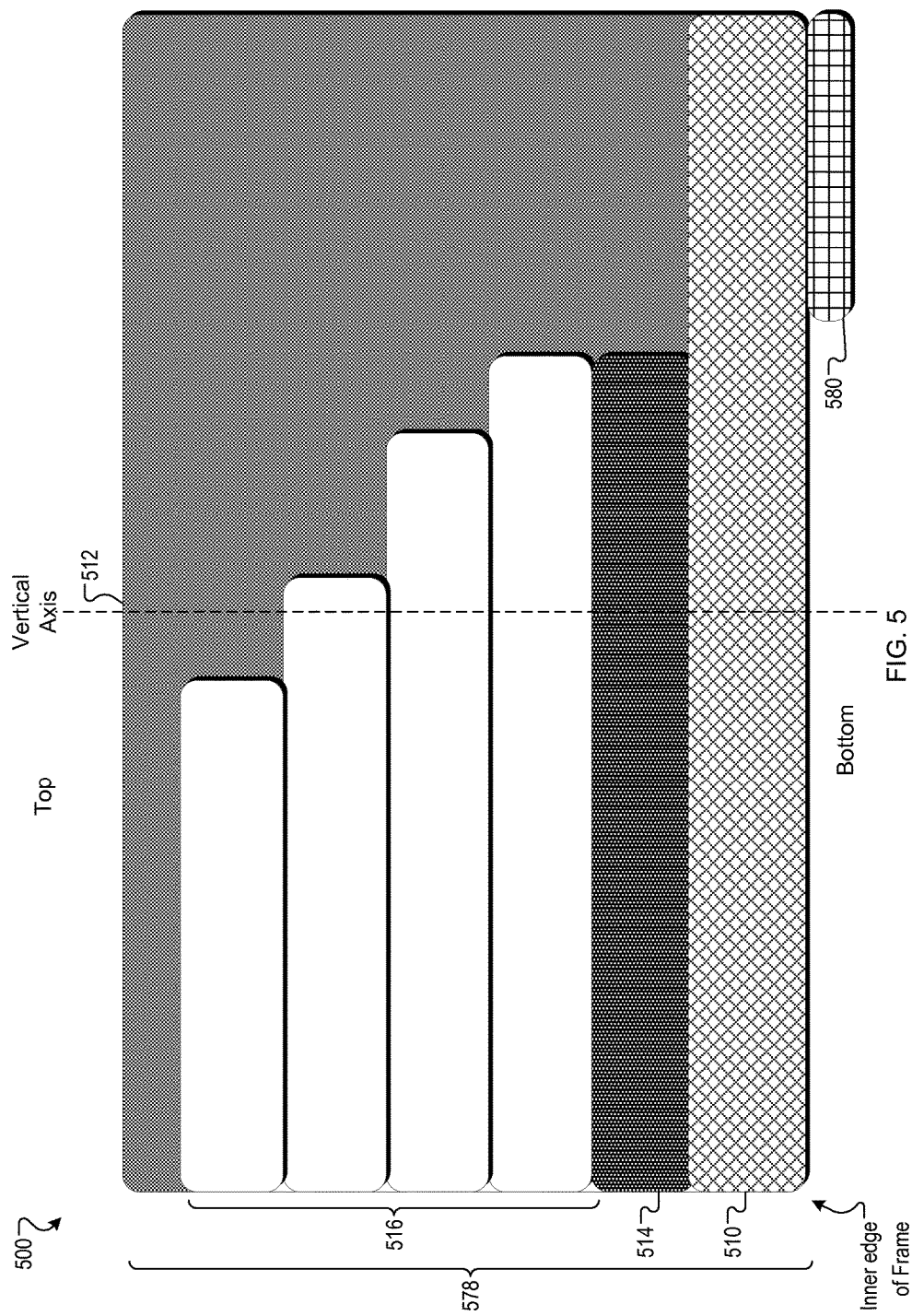
FIG. 5 illustrates a display assembly with a reflective display screen, a cover glass, a black ink layer, set of white ink layers, and an antiglare layer that covers the black ink layer and the set of white ink layers according to one embodiment.

FIG. 5 illustrates a display assembly 500 with a reflective display 580, a cover glass 510, a black ink layer 514, a set of white ink layers 516, and an antiglare layer 512 that covers the black ink layer 514 and the set of white ink layers 516 according to one embodiment. The cover glass 510 is a bottom layer that is a cover glass that faces the reflective display 210 (FIG. 2A) and can protect the reflective display from damage, water, dust, and so forth. In one embodiment, the cover glass 510 is the bottom layer, the black ink layer 514 is above the cover glass 410, and the set of white ink layers 516 is above the black ink layer 514. In one embodiment, the set of white ink layers 516 mask a color of the black ink layer 514 from a surface of the light guide cover 578 facing a viewer to maintain an appearance of a white layer across a surface of the reflective display. In another embodiment, the black ink layer 514 eliminates an illumination of the white ink by absorbing recycled light.

In another embodiment, the antiglare layer 512 can be a coating to cover or encapsulate the cover glass 510, the black ink layer 514, and the set of white ink layers 516 of the display assembly 500. For example, the antiglare layer 512 can include a first antiglare layer portion that is coplanar to the set of white ink layers 516 and a second antiglare layer portion that is located above the set of white ink layers 516.

The antiglare layer 512 can reduce the glare of the cover glass 510 across the display assembly 500. One advantage of the antiglare layer 512 covering the cover glass 510, the black ink layer 514, and the set of white ink layers 516 of the display assembly 500 to provide a smooth tactile feel by having a smooth and continuous top surface.

FIG. 6 illustrates a display assembly 600 with a reflective display 680, a cover glass 610, a black ink layer 614, a set of white ink layers 616, and an antiglare layer 612 according to one embodiment. The cover glass 610 is a bottom layer that is a cover glass that faces the reflective display 210 (FIG. 2A) and can protect the reflective display from damage, water, dust, and so forth. In one embodiment, the cover glass 610 is the bottom layer, the black ink layer 614 is above the cover glass 610, and the set of white ink layers 616 is above the black ink layer 614.

The antiglare layer 612 is above the cover glass 610 and abuts against to the black ink layer 614 and to the set of white ink layers 616. The antiglare layer 612 can be a coating to cover an active area of the display assembly 600. In one example, the active area is an area of a touch screen display that can be touched by a user. In another example, the active area is an area of a display that is viewable to the user. In one embodiment, the set of white ink layers 616 mask a color of the black ink layer 614 from a surface of the light guide cover 678 facing a viewer to maintain an appearance of a white layer across a surface of the reflective display. In another embodiment, the black ink layer 614 eliminates an illumination of the white ink from below by absorbing recycled light. One advantage of the antiglare layer 612 abutting against the cover glass 610, the black ink layer 614, and the set of white ink layers 616 of the display assembly 600 to provide a smooth tactile feel by having a smooth and continuous top surface.

FIG. 7A illustrates a display assembly 700 with a reflective display 780, a cover glass 710, an aluminum layer 718, a set of white ink layers 716, and an antiglare layer 712 according to one embodiment. The cover glass 710 is a bottom layer that is a cover glass that faces the reflective display 210 (FIG. 2A) and can protect the reflective display from damage, water, dust, and so forth. In one embodiment, the cover glass 710 is the bottom layer, the aluminum layer 718 is above the cover glass 710, and the set of white ink layers 716 is above the aluminum layer 718.

The antiglare layer 712 is above the cover glass 710 and can be a coating to cover the aluminum layer 718 and the set of white ink layers 716. In one embodiment, the aluminum layer 718 is less than 1 μm thick. In another embodiment, the aluminum layer 718 is approximately 0.1 μm thick. In one embodiment, the aluminum layer 718 eliminates an illumination of the white ink by absorbing recycled light from below. In another embodiment, the antiglare layer 712 can cover the cover glass 710, the aluminum layer 718, and a set of white ink layers 716 of the display assembly 700 to reduce the glare of the cover glass 710 across the display assembly 700. In one embodiment, the set of white ink layers 716 masks a color of the aluminum layer 718 from a surface of the light guide cover 778 facing a viewer to maintain an appearance of a white layer across a surface of the reflective display. One advantage of the antiglare layer 712 covering the cover glass 710, the black ink layer 714, and the set of white ink layers 716 of the display assembly 700 provides a smooth tactile feel by having a smooth and continuous top surface. Another advantage of the display assembly 700 with the aluminum layer 718 is that the aluminum layer 718 can be thinner than a black ink layer to reduce an overall thickness of the display assembly 700. For example, the aluminum layer 718 can be 50-100 nanometers (nm) thick. In another example, the aluminum is not as dark or black as the black ink layer, so a fewer number of white ink layers 716 can be used.

The aluminum layer can be applied to a non-active area of a display screen. The non-active area can be a non-touch sensitive portion of a touch screen display or the non-active area can be a location on the display assembly that does not display anything. For example, the aluminum of the aluminum layer can be sputtered or evaporated aluminum on top the cover glass 710. The aluminum layer may be applied at one or more edges of a surface of the display assembly 700. When the aluminum layer is applied, the display screen can be masked or covered so that only the edges of the display screen may have an aluminum layer.

FIG. 7B illustrates a display assembly 700 with a reflective display 780, a black ink layer 714, a cover glass 710, an aluminum layer 718, a set of white ink layers 716, and an antiglare layer 712 according to one embodiment. The reference numbers in FIG. 7B can have the same numbers as in FIG. 7A to indicate the same or similar features or components as shown in FIG. 7A. However, the features or components of FIG. 7A are not intended to be limiting and other features or components can be used.

In one embodiment, the antiglare layer 712 can be a coating to cover the cover glass 710, the aluminum layer 718, and the set of white ink layers 716 of the display assembly 700 to reduce the glare of the cover glass 710 across the display assembly 700 and provide a protective layer. In one embodiment, the antiglare layer 712 can include a first antiglare portion 719 a second antiglare portion 720, and a third antiglare portion 722. The first antiglare portion 719 can be located above the set of white ink layers 716. The second antiglare portion 720 can abut against the aluminum layer 718 and the set of white ink layers 716. The third antiglare portion 722 can be located above the cover glass 710.

In one example, when the aluminum layer 718 is used to reflect light, the number of white ink layers in the set of white ink layers 716 can be decreased while still masking the color of the aluminum layer 718 because of an opacity level of the aluminum layer 718. When the number of white ink layers in the set of white ink layers 716 decreases below a threshold number of layers or a threshold thickness, a black layer 714 can be located below the cover glass 710 to absorb the reflected light and reduce or eliminate a glow portion of the reflective display 780.

Figure 7C:
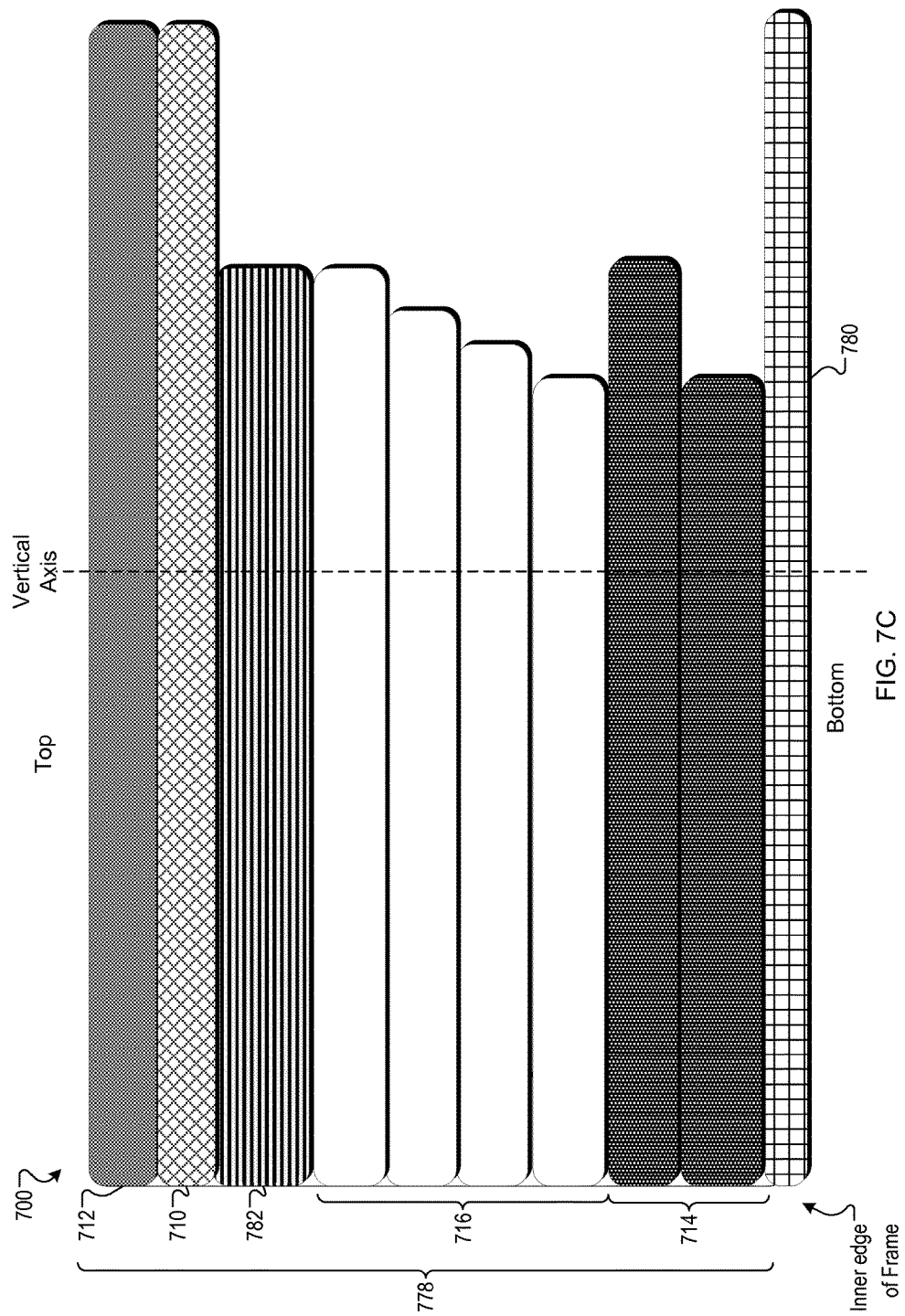
FIG. 7C illustrates a display assembly with a set of black ink layers, a set of white ink layers, a low refraction index layer, a cover glass, and an antiglare layer according to one embodiment.

FIG. 7C illustrates a display assembly 700 with a set of black ink layers 714, a set of white ink layers 716, a low refraction index layer 782, a cover glass 710, and an antiglare layer 712 according to one embodiment. The reference numbers in FIG. 7C can have the same numbers as in FIG. 7A to indicate the same or similar features or components as shown in FIG. 7A. However, the features or components of FIG. 7A are not intended to be limiting and other features or components can be used.

In one embodiment, the reflective display 780 can be a bottom layer of the display assembly 700. The set of black ink layers 714 can be disposed above the display 780. The set of black ink layers can absorb light that reflects off the reflective display 780. The set of white ink layers 716 can be disposed above the set of black ink layers 714. The low refraction index layer 782 can be disposed above the set of white ink layers 716. The cover glass 710 can be disposed above the low refraction index layer 782. The antiglare layer 712 can be disposed above the cover glass 710. In one embodiment, the low refraction index layer 782 can be a low refraction index material. In another embodiment, the refraction index of the low refraction index layer 782 can be approximately 1.000293 nm (e.g., approximately air). For example, the low refraction index layer 782 can be a low refraction index material with hollow spheres of glass filled with air. The hollow spheres can be hollow glass spheres with a thickness of 60 nm. In another example, the hollow spheres can be silica hollow spheres in a silicone or acrylic resin layer. In another example, the hollow spheres can be made using sol-gel processes. In another example, the hollow spheres are polystyrene hollow spheres and the set of black ink layers 714 and the set of white ink layers 716 are thermoplastic inks to eliminate or reduce the hollow spheres deforming during thermal process and screen printing of the ink layers 714 and 716.

The index of refraction for the hollow spheres can be based on a density of the hollow spheres in an area, size of the spheres, and wall thickness of the hollow spheres. In one example, the low refraction index layer 782 can have a thickness of approximately 4-7 μm with the hollow spheres having a radius of approximately 2-3 um. The hollow glass spheres can have a hard level to avoid collapsing during screen printing and curing of the set of white ink layers 716. One advantage of the low refraction index layer 782 can be to enable the set of black ink layers 714 and the set of white ink layers 716 to be disposed below the cover glass 710 while avoid a decreased abrasion resistance of the top surface of the display assembly 700. Another advantage of the low refraction index layer 782 can be to avoiding cosmetic defects of the set of black ink layers 714 and the set of white ink layers 716 caused by the cover glass 710.

Figure 8:
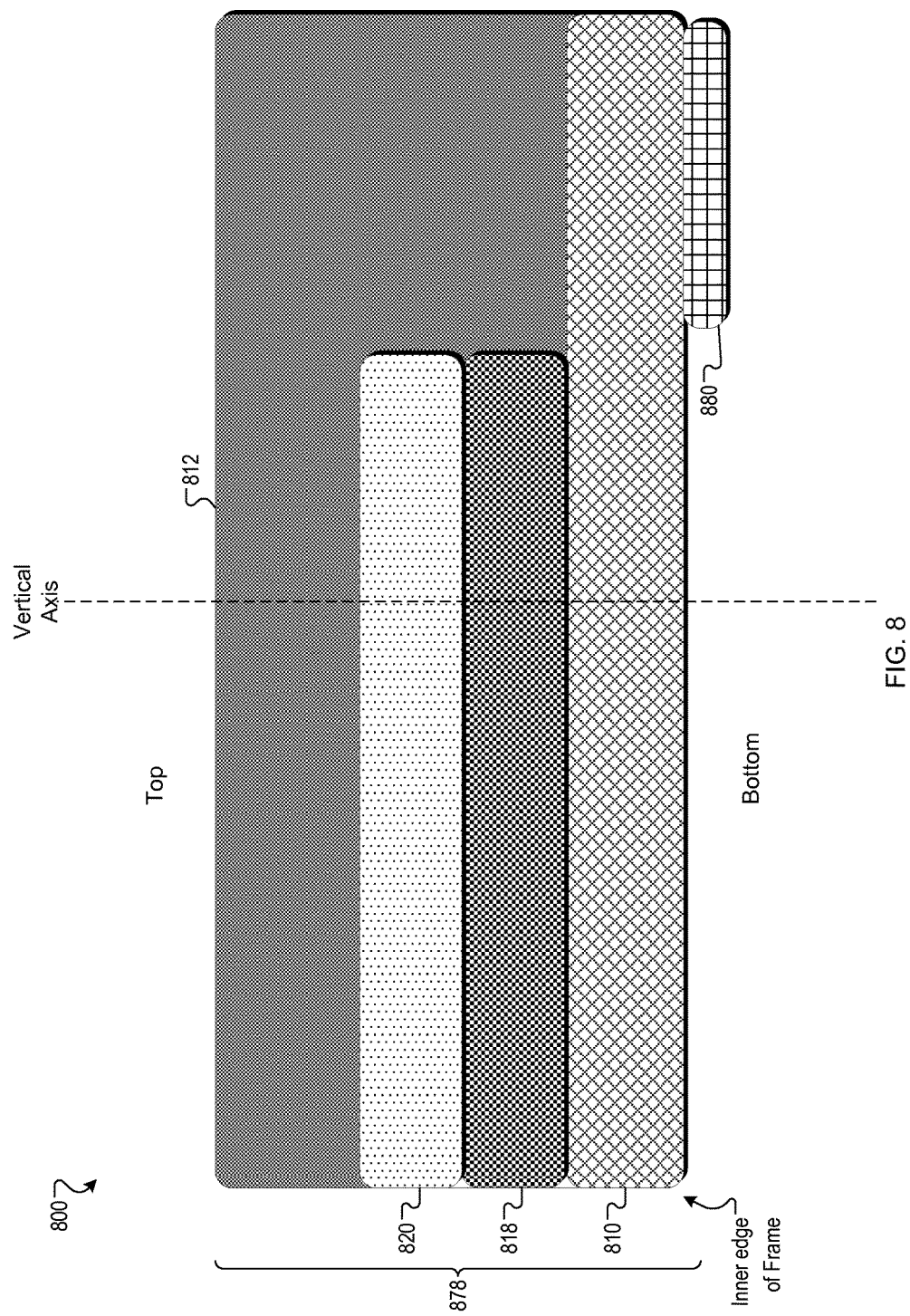
FIG. 8 illustrates a display assembly with a reflective display screen, a cover glass, an aluminum layer, a sputtered white layer, and an antiglare layer according to one embodiment.

FIG. 8 illustrates a display assembly 800 with a reflective display 880, a cover glass 810, an aluminum layer 818, a sputtered white layer 820, and an antiglare layer 812 according to one embodiment. The cover glass 810 is a bottom layer that is a cover glass that faces the reflective display 210 (FIG. 2A) and can protect the reflective display from damage, water, dust, and so forth. In one embodiment, the cover glass 810 is the bottom layer, the aluminum layer 818 is above the cover glass 810, and sputtered white layer 820 is above the aluminum layer 818.

The antiglare layer 812 is above the cover glass 810 and can be a coating to cover the aluminum layer 818 and the sputtered white layer 820. In one embodiment, the aluminum layer 818 eliminates an illumination of the white ink by absorbing recycled light from below. In one embodiment, the sputtered white layer 820 masks a color of the aluminum layer 818 from a surface of the light guide cover 878 facing a viewer to maintain an appearance of a white layer across a surface of the reflective display. In another embodiment, the set of sputtered white layers can increase a white opacity level of the display. In another embodiment, the sputtered white layer 820 can replace the white ink layer or set of white ink layers in FIGS. 3-7. The sputtered white layer 820 can be a magnesium oxide (MgO) layer, a zinc oxide (ZnO) layer, an aluminum oxide (Al2O3) layer, or a tin or stannic oxide (SnO2) layer.

In another embodiment, the antiglare layer 812 can cover the cover glass 810, the aluminum layer 818, and the sputtered white layer 820 of the display assembly 800 to reduce the glare of the cover glass 810 across the entire display assembly 800. One advantage of the antiglare layer 812 covering the cover glass 810, the aluminum layer 818, and the sputtered white layer 820 of the display assembly 800 is that the fully covered display assembly 800 provides a smooth tactile feel. Another advantage of the display assembly 800 with the aluminum layer 818 is that the aluminum layer 818 can be thinner than a black ink layer to reduce an overall thickness of the display assembly 800. Another advantage of the display assembly 800 with the sputtered white layer 820 is that the sputtered white layer 820 can be thinner than the set of white ink layers to reduce an overall thickness of the display assembly 800. For example, the sputtered white layer 820 is a thinner material than a set of white ink layers. In one embodiment, the sputtered white layer 820 can be less than 5 micrometers (μm) thick. In another embodiment, the sputtered white layer 820 has a thickness between approximately 100 nanometers (nm) and 1 micrometers (μm) thick. In another example, the sputtered white layer 820 has a different opacity to reduce a thickness and number of layers on the surface of the display assembly 800.

Figure 9A:
FIG. 9A illustrates a display assembly with a reflective display, a cover glass or film, an optically clear adhesive (OCA) layer, a black ink layer, a set of white ink layers, a film, and an antiglare layer according to one embodiment.

FIG. 9A illustrates a display assembly 900 with a reflective display 980, a cover glass or film 910, an optically clear adhesive (OCA) layer 924, a black ink layer 914, a set of white ink layers 916, a film 930, and an antiglare layer 912 according to one embodiment. The cover glass or film 910 is a bottom layer that is a cover glass that faces the reflective display 210 (FIG. 2A) and can protect the reflective display from damage, water, dust, and so forth. In one embodiment, the cover glass or film 910 is the bottom layer, the OCA layer 924 is above the cover glass or film 910, the black ink layer 914 is above the OCA layer 924, the set of white ink layers 916 is above the black ink layer 914, the film 930 is above the set of white ink layers 916, and the antiglare layer 912 is above the film 930.

The OCA layer 924 can include a first OCA portion 926 that is located between the cover glass or film 910 and the black ink layer 914. In another embodiment, the OCA layer 924 can include a second OCA portion 928 that abuts against the black ink layer 914, the set of white ink layers 916, and the first OCA portion 926. The second OCA portion 928 can be located between the cover glass or film 910 and the film 930. In another embodiment, the film 930 can be a thin glass layer or substrate, where the film 930 is approximately 50 μm to 100 um. In another embodiment, the film 930 is laminated with an antiglare layer or coating 912. The black ink layer 914 and set of white ink layers 916 can be located between the film 930 and the cover glass or film 910.

In one embodiment, the black ink layer 914 eliminates an illumination of the white ink by absorbing recycled light from below. In another embodiment, the set of white ink layers 916 masks a color of the black ink layer 914 from a surface of the light guide cover 978 facing a viewer to maintain an appearance of a white layer across a surface of the reflective display. In another embodiment, the film 930 can cover the black ink layer 914, the set of white ink layers 916, the OCA layer 924, and the cover glass or film 910 of the display assembly 900 to reduce the glare of the cover glass 910 across the display assembly 900. One advantage of the film 930 covering the black ink layer 914, the set of white ink layers 916, the OCA layer 924, and the cover glass or film 910 of the display assembly 900 to provide a smooth tactile feel by having a smooth and continuous top surface. Another advantage of the antiglare layer 912 being the top layer to provide a durable outer surface.

FIG. 9B illustrates a display assembly 900 with a reflective display 980, a cover glass or film 910, an optically clear adhesive (OCA) layer 924, a black ink layer 914, a set of white ink layers 916, a film 930, and an antiglare layer 912 according to one embodiment. The reference numbers in FIG. 9B can have the same numbers as in FIG. 9A to indicate the same or similar features or components as shown in FIG.

9A. However, the features or components of FIG. 9A are not intended to be limiting and other features or components can be used.

The OCA layer 924 can include a first OCA portion 926 that is located between the film 930 and the set of white ink layers 916. In another embodiment, the OCA layer 924 can include a second OCA portion 928 that abuts against the black ink layer 914, the set of white ink layers 916, and the first OCA portion 926. The second OCA portion 928 can be located between the cover glass or film 910 and the film 930.

FIG. 10 illustrates a display assembly 1000 with a reflective display 1080, an antiglare layer 1014, a cover glass 1010, a set of white ink layers 1016, a set of first black ink layers 1030, and a second black ink layer 1032 according to one embodiment. The antiglare layer 1014 is a top layer that is an antiglare layer 1014 that faces the reflective display 1080 and can protect the reflective display 1080 from damage, water, dust, and so forth. In one embodiment, reflective display 1080 is the bottom layer. The set of first black ink layers 1030 abuts against one or more middle or bottom white ink layers of the set of white ink layers 1016. The set of first black ink layers 1030 can be below the bottom white ink layer of the set of white ink layers 1016. The second black ink layer 1032 is below the cover glass 1010 and abuts against a top white ink layer of the set of white ink layers 1016. The set of white ink layers 1016 is above the set of first black ink layers 1030 and adjacent the second black ink layer 1030. The cover glass 1010 is above set of white ink layers 1016 and the second black ink layer 1032. The antiglare layer 1014 is above the cover glass 1010.

In one embodiment, the first and second black ink layers 1030 and 1032 eliminate an illumination of the white ink by absorbing recycled light from below before the light reaches the set of white ink layers 1016. In another embodiment, the set of white ink layers 1016 masks a color of the set of first black ink layers 1030 and the second black ink layer 1032 from a surface of the light guide cover 1078 facing a viewer to maintain an appearance of a white layer across a surface of the reflective display.

FIGS. 3-10 are not intended to be limiting. The various layers discussed in the preceding paragraphs can be located in a variety of orders or arrangements. The different types of layers discussed in the preceding paragraphs can also be include or excluded in the various display assemblies.

Figure 11:
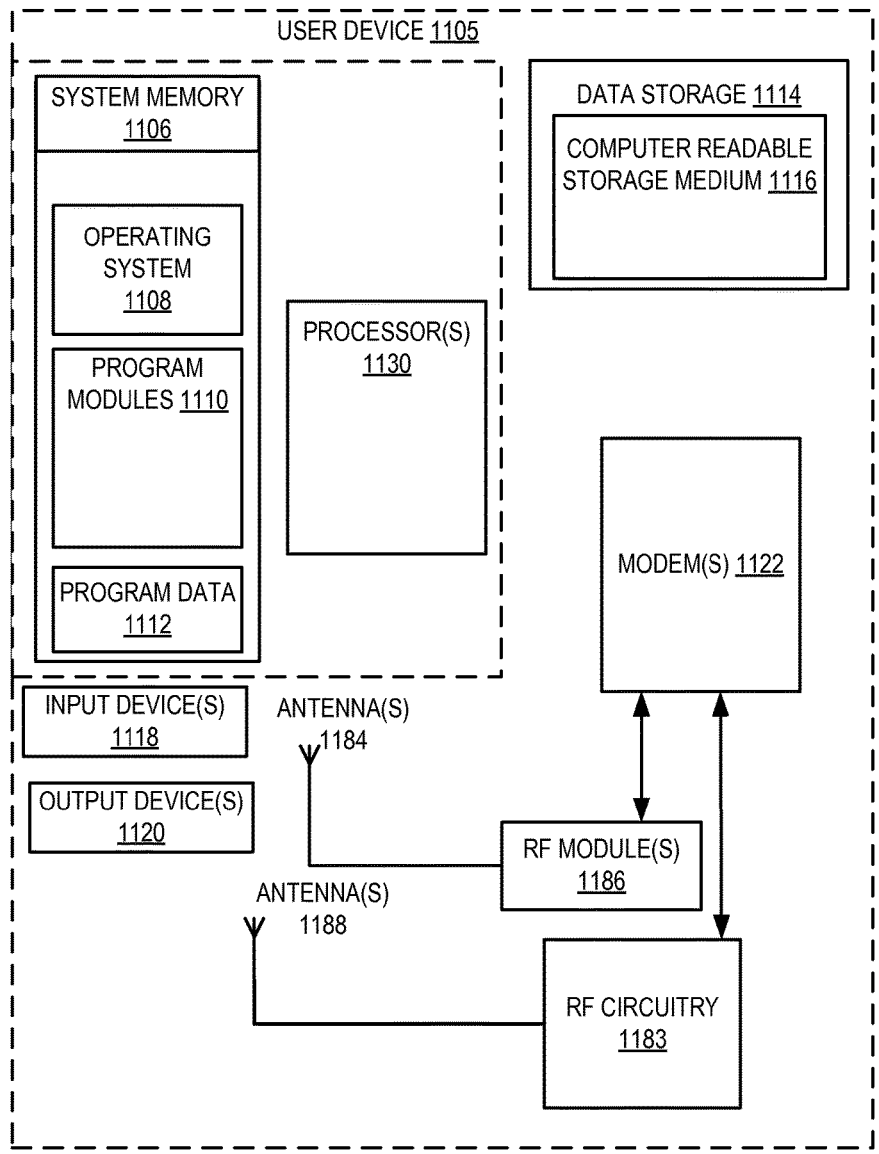
FIG. 11 is a block diagram of an electronic device in which embodiments of a radio device with an antenna structure may be implemented.

FIG. 11 is a block diagram of an electronic device 1105 in which embodiments of an antenna structure 1100 may be implemented. The electronic device 1105 may correspond to the electronic device 100 of FIG. 1. The electronic device 1105 may be any type of computing device such as an electronic book reader, a PDA, a mobile phone, a laptop computer, a portable media player, a tablet computer, a camera, a video camera, a netbook, a desktop computer, a gaming console, a DVD player, a Blu-ray®, a computing pad, a media center, a voice-based personal data assistant, and the like. The electronic device 1105 may be any portable or stationary electronic device. For example, the electronic device 1105 may be an intelligent voice control and speaker system. Alternatively, the electronic device 1105 can be any other device used in a WLAN network (e.g., Wi-Fi® network), a WAN network, or the like.

The electronic device 1105 includes one or more processor(s) 1130, such as one or more CPUs, microcontrollers, field programmable gate arrays, or other types of processors. The electronic device 1105 also includes system memory 1106, which may correspond to any combination of volatile and/or non-volatile storage mechanisms. The system memory 1106 stores information that provides operating system component 1108, various program modules 1110, program data 1112, and/or other components. In one embodiment, the system memory 1106 stores instructions of the methods as described herein. The electronic device 1105 performs functions by using the processor(s) 1130 to execute instructions provided by the system memory 1106.

The electronic device 1105 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 may reside, completely or at least partially, within the computer-readable storage medium 1116, system memory 1106 and/or within the processor(s) 1130 during execution thereof by the electronic device 1105, the system memory 1106 and the processor(s) 1130 also constituting computer-readable media. The electronic device 1105 may also include one or more input devices 1118 (keyboard, mouse device, specialized selection keys, etc.) and one or more output devices 1120 (displays, printers, audio output mechanisms, etc.).

The electronic device 1105 further includes a modem 1122 to allow the electronic device 1105 to communicate via a wireless network (e.g., such as provided by the wireless communication system) with other computing devices, such as remote computers, an item providing system, and so forth. The modem 1122 can be connected to RF circuitry 1183 and zero or more RF modules 1186. The RF circuitry 1183 may be a WLAN module, a WAN module, PAN module, or the like. Antennas 1188 are coupled to the RF circuitry 1183, which is coupled to the modem 1122. Zero or more antennas 1184 can be coupled to one or more RF modules 1186, which are also connected to the modem 1122. The zero or more antennas 1184 may be GPS antennas, NFC antennas, other WAN antennas, WLAN or PAN antennas, or the like. The modem 1122 allows the electronic device 1105 to handle both voice and non-voice communications (such as communications for text messages, multimedia messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1122 may generate signals and send these signals to antenna 1188 and 1184 via RF circuitry 1183 and RF module(s) 1186 as described herein. Electronic device 1105 may additionally include a WLAN module, a GPS receiver, a PAN transceiver and/or other RF modules. These RF modules may additionally or alternatively be connected to one or more of antennas 1184, 1188. Antennas 1184, 1188 may be configured to transmit in different frequency bands and/or using different wireless communication protocols. The antennas 1184, 1188 may be directional, omnidirectional, or non-directional antennas. In addition to sending data, antennas 1184, 1188 may also receive data, which is sent to appropriate RF modules connected to the antennas.

In one embodiment, the electronic device 1105 establishes a first connection using a first wireless communication protocol, and a second connection using a different wireless communication protocol. The first wireless connection and second wireless connection may be active concurrently, for example, if an electronic device is downloading a media item from a server (e.g., via the first connection) and transferring a file to another electronic device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1122 is shown to control transmission and reception via antenna (1184, 1188), the electronic device 1105 may alternatively include multiple modems, each of which is configured to transmit/receive data via a different antenna and/or wireless transmission protocol.

The electronic device 1105 delivers and/or receives items, upgrades, and/or other information via the network. For example, the electronic device 1105 may download or receive items from an item providing system. The item providing system receives various requests, instructions and other data from the electronic device 1105 via the network. The item providing system may include one or more machines (e.g., one or more server computer systems, routers, gateways, etc.) that have processing and storage capabilities to provide the above functionality. Communication between the item providing system and the electronic device 1105 may be enabled via any communication infrastructure. One example of such an infrastructure includes a combination of a wide area network (WAN) and wireless infrastructure, which allows a user to use the electronic device 1105 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products using the Wi-Fi® technology based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the electronic device 1105.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The electronic devices 1105 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices 1105 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "ally inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
   an electronic paper display (EPD);
   a glass substrate disposed on a top side of the EPD;
   a light guide, disposed above the glass substrate, to propagate light from a light source toward the EPD;
   the light source adjacent to the light guide to emit light towards the light guide; and
   a light guide cover disposed above the light guide, the light guide cover comprises:
      a cover glass disposed above the light guide;
      an aluminum layer, disposed above the cover glass and around an edge of the EPD, the aluminum layer reflects light from the EPD to reduce an amount of light emitted around a border of the EPD;
      a white ink layer disposed above the aluminum layer to mask a color of the aluminum layer from a surface of the light guide cover; and
      an antiglare layer, disposed above the cover glass and adjacent the white ink layer, to reduce light reflected off the cover glass.

2. The electronic device of claim 1, the antiglare layer further comprising:
   a first antiglare layer portion that is coplanar to the white ink layer; and
   a second antiglare layer portion disposed above the white ink layer.

3. The electronic device of claim 1, further comprising a frame, wherein:
   an edge of the cover glass, an edge of the aluminum layer, an edge of the white ink layer, and an edge of the antiglare layer are adjacent to a portion of the frame that encloses the EPD, and
   the edge of the cover glass, the edge of the aluminum layer, the edge of the white ink layer, and the edge of the antiglare layer are coplanar to the portion of the frame that encloses the EPD.

4. A display comprising:
   a reflective display;
   a light guide disposed on a top side of the reflective display; and
   a light guide cover disposed on the light guide, the light guide cover comprising:
      a cover glass disposed above the light guide;
      an opaque layer disposed above the cover glass and around an edge of the reflective display, wherein the opaque layer absorbs light reflected off the reflective display; and
      a white ink layer disposed above the opaque layer.

5. The display of claim 4, further comprising an antiglare layer disposed above the cover glass and adjacent the white ink layer.

6. The display of claim 5, the antiglare layer further comprising:
   a first antiglare layer portion that is coplanar to the white ink layer; and
   a second antiglare layer portion disposed above the white ink layer.

7. The display of claim 4, wherein the white ink layer masks a color of the opaque layer from being visible.

8. The display of claim 4, wherein the white ink layer is approximately 100 nanometers (nm) to 1 micrometers (μm) thick.

9. The display of claim 4, wherein the white ink layer comprises a plurality of white ink layers, wherein each of the plurality of white ink layers modifies an opacity level of the display.

10. The display of claim 4, further comprising a frame, wherein:
    an edge of the cover glass, an edge of the opaque layer, and an edge of the white ink layer are adjacent to a portion of the frame that encloses the reflective display, and
    the edge of the cover glass, the edge of the opaque layer, and the edge of the white ink layer are coplanar to the portion of the frame that encloses the reflective display.

11. The display of claim 4, further comprising a frame, wherein an edge of the opaque layer is offset from an inner edge of the frame by a first distance and an edge of the white ink layer is offset from the inner edge of the frame by a second distance.

12. The display of claim 4, further comprising an opaque layer disposed below the cover glass.

13. The display of claim 4, wherein the white ink layer comprises magnesium oxide (MgO), zinc oxide (ZnO), aluminum oxide (Al2O3) r, or stannic oxide (SnO2).

14. The display of claim 4, further comprising an optically clear adhesive (OCA) layer coplanar to the opaque layer and the white ink layer.

15. An electronic device comprising:
    a reflective display;
    a light guide disposed above the reflective display;
    a light guide cover disposed above the light guide, the light guide cover comprising:
       a cover glass disposed above the light guide;
       an aluminum layer disposed above the cover glass and around an edge of the reflective display, wherein the aluminum layer reflects light from the reflective display;
       a white ink layer, disposed above the aluminum layer; and
       an antiglare layer, disposed above the cover glass, covering the white ink layer and the aluminum layer.

16. The electronic device of claim 15, wherein:
    the reflective display is a touch screen display, and the antiglare layer covers an active area of the touch screen display.

17. The electronic device of claim 15, wherein the aluminum layer is disposed on a first side of the reflective display and a light source of the light guide is disposed on a second side of the reflective display, the first side being opposite the second side.

18. The electronic device of claim 15, wherein:
the reflective display is a borderless display, and
the aluminum layer is disposed on a dead zone portion of the reflective display where no information is displayed.

19. The electronic device of claim 15, further comprising a planarization layer, wherein:
the planarization layer is coplanar to the aluminum layer and the white ink layer, and
the planarization layer is adjacent to the aluminum layer and the white ink layer.

20. The electronic device of claim 15, further comprising a black ink layer disposed below the cover glass.

\* \* \* \* \*